(12) United States Patent
Chen et al.

(10) Patent No.: US 12,656,576 B2
(45) Date of Patent: Jun. 16, 2026

(54) OPTICAL LENS ASSEMBLY COMPRISING A TOTAL OF FOUR LENSES WITH REFRACTIVE POWER AND ELECTRONIC DEVICE

(71) Applicant: NEWMAX TECHNOLOGY CO., LTD., Taichung City (TW)

(72) Inventors: Ping-Yi Chen, Taichung City (TW); Ching-Yun Huang, Taichung City (TW); Fei-Hsin Tsai, Taichung City (TW)

( * ) Notice: Subject to any disclaimer, the term of this patent is extended or adjusted under 35 U.S.C. 154(b) by 365 days.

(21) Appl. No.: 18/442,019

(22) Filed: Feb. 14, 2024

(65) Prior Publication Data

US 2025/0180864 A1 Jun. 5, 2025

(30) Foreign Application Priority Data

Dec. 4, 2023 (TW) ................................. 112146977

(51) Int. Cl.
| | |
|---|---|
| *G02B 9/34* | (2006.01) |
| *G02B 5/30* | (2006.01) |
| *G02B 27/01* | (2006.01) |

(52) U.S. Cl.
CPC ............. *G02B 9/34* (2013.01); *G02B 5/3025* (2013.01); *G02B 5/3083* (2013.01); *G02B 27/0172* (2013.01)

(58) Field of Classification Search
CPC .................................................. G02B 13/0055
See application file for complete search history.

(56) References Cited

U.S. PATENT DOCUMENTS

| | | | |
|---|---|---|---|
| 2020/0284963 A1* | 9/2020 | Yun ...................... | G02B 5/3083 |
| 2023/0217091 A1* | 7/2023 | Huang ............... | G02B 13/0045 |
| | | | 348/335 |
| 2024/0004202 A1* | 1/2024 | Kim ....................... | G02B 27/01 |
| 2024/0255734 A1* | 8/2024 | Ishida ................ | G02B 17/0856 |

FOREIGN PATENT DOCUMENTS

CN 116880074 A * 10/2023 ......... G02B 27/0101

* cited by examiner

*Primary Examiner* — Paul C Lee
(74) *Attorney, Agent, or Firm* — BruceStone LLP; Joseph A. Bruce

(57) ABSTRACT

An optical lens assembly includes: a reflective polarizer, a phase retarder, and in order from a visual side to an image source side: a first lens, a second lens, a third lens, a partial-reflective-partial-transmissive element and a fourth lens. The reflective polarizer is disposed between the first lens and the second lens, and the phase retarder is disposed between the reflective polarizer and the partial-reflective-partial-transmissive element. The optical lens assembly may become lightweight and have good image quality when satisfying a specific condition.

20 Claims, 10 Drawing Sheets

1

OPTICAL LENS ASSEMBLY COMPRISING A TOTAL OF FOUR LENSES WITH REFRACTIVE POWER AND ELECTRONIC DEVICE

BACKGROUND

Field of the Invention

The present invention relates to an optical lens assembly and electronic device, and more particularly to an optical lens assembly applicable to electronic devices (for example, but not limited to, head-mounted electronic devices).

Description of Related Art

With the development of the semiconductor industry, the functions of various consumer electronic products are increasingly powerful. Moreover, various services of the software application end emerge. These enable consumers to have more choices. Virtual reality (VR) technology emerges when the market is no longer satisfied with handheld electronic products. Nowadays, the application of virtual reality opens up a blue ocean market for consumer electronics, and in the application field of virtual reality, the first commercialized project is the head-mounted display.

However, the current head-mounted displays are heavy and have poor image quality.

The present invention mitigates and/or obviates the aforementioned disadvantages.

SUMMARY

The objective of the present invention is to provide an optical lens assembly and an electronic device, which can reduce the number of lenses by folding the light path, so as to the reduce the weight of the device, and provide better image quality.

Therefore, an optical lens assembly in accordance with an embodiment of the present invention includes: a reflective polarizer; a phase retarder; and in order from a visual side to an image source side, a first lens with positive refractive power, a second lens with refractive power, a third lens with refractive power including a visual-side surface and an image source-side surface, a partial-reflective-partial-transmissive element, and a fourth lens with refractive power. The image source-side surface of the third lens is convex in a paraxial region thereof. The reflective polarizer is disposed between the first lens and the second lens, and the phase retarder is disposed between the reflective polarizer and the partial-reflective-partial-transmissive element.

In the optical lens assembly, a focal length of the optical lens assembly is f, a focal length of the first lens is f1, a focal length of the second lens is f2, a focal length of the third lens is f3, a focal length of the fourth lens is f4, a maximum effective radius of a visual-side surface of the first lens is CA1, a maximum effective radius of an image source-side surface of the second lens is CA4, a thickness of the first lens along the optical axis is CT1, a thickness of the second lens along the optical axis is CT2, a thickness of the third lens along the optical axis is CT3, a thickness of the fourth lens along the optical axis is CT4, a radius of curvature of the visual-side surface of the first lens is R1, a radius of curvature of an image source-side surface of the first lens is R2, a radius of curvature of a visual-side surface of the third lens is R5, a radius of curvature of the image source-side surface of the third lens is R6, a radius of curvature of a visual-side surface of the fourth lens is R7, an absolute value of a displacement in parallel to the optical axis from an intersection between the visual-side surface of the first lens and the optical axis to a maximum effective radius position on the visual-side surface of the first lens is TDP1, an absolute value of a displacement in parallel to the optical axis from an intersection between a visual-side surface of the second lens and the optical axis to a maximum effective radius position on the visual-side surface of the second lens is TDP3, an absolute value of a displacement in parallel to the optical axis from an intersection between the image source-side surface of the third lens and the optical axis to a maximum effective radius position on the image source-side surface of the third lens is TDP6, and at least one of the following conditions is satisfied:

$$0.37 < CT3/TDP6 < 5.39;$$
$$4.42 < CA1/TDP1 < 41.58;$$
$$-1.92 < f3/R6 < 8.96;$$
$$2.61 < f1/f < 25.10;$$
$$-106.00 < f2/CT2 < 19.81;$$
$$-120.81 < (f3/CT3) + (f4/CT4) < 158.75;$$
$$7.80 < f1/CT1 < 256.47;$$
$$-7.72 < (f2/CT1) + (f1/CT2) < 100.65;$$
$$-1.28 < f1/f2 < 7.37;$$
$$4.88 < R5*R6/(f2*CT2) < 40.13;$$
$$5.29 < R7/CT4 < 78.07;$$
$$2.58 < CA4/(TDP3 + TDP6) < 10.54;$$
$$5.27 < R1/CT1 < 139.95;$$
$$10.14 \text{ mm} < (CT4*f1)/(CT2 + CT3) < 278.32 \text{ mm};$$
$$0.27 < R1/f1 < 1.33;$$
$$-5.69 \text{ mm} < (R1/R2)*CT1 < 1.16 \text{ mm; and}$$
$$-1.07 < R6/R5 < 2.24.$$

When 0.37<CT3/TDP6<5.39 is satisfied, it is conducive to optimizing the image quality, the performance, the modulation transfer function (MTF) and the assembly stability of the third lens.

When 4.42<CA1/TDP1<41.58 is satisfied, it is conducive to achieving a large field of view and optimizing the formability of the first lens.

When −1.92<f3/R6<8.96 is satisfied, it is conducive to effectively correcting the optical aberration of the image source side by adjusting the radius of curvature of the image source-side surface of the third lens.

When 2.61<f1/f<25.10 is satisfied, it is conducive to enhancing the wide-field of view characteristic of the optical lens assembly, providing a larger field of view and maintaining the illuminance of the optical lens assembly.

When −106.00<f2/CT2<19.81 is satisfied, it is conducive to achieving a proper balance between the refractive power and the thickness of the second lens.

When −120.81<(f3/CT3)+(f4/CT4)<158.75 is satisfied, it is conducive to enhancing the wide-field of view characteristic of the optical lens assembly, providing a larger field of view and maintaining the illuminance of the optical lens assembly.

When 7.80<f1/CT1<256.47 is satisfied, it is conducive to achieving the more appropriate distribution of the refractive power of the optical lens assembly, thereby reducing the optical aberration.

When −7.72<(f2/CT1)+(f1/CT2)<100.65 is satisfied, it is conducive to achieving a proper balance between the cooperation of the thickness and the refractive power of the first lens and the cooperation of the thickness and the refractive power of the second lens.

When −1.28<f1/f2<7.37 is satisfied, it is conducive to achieving the more appropriate distribution of the refractive power of the optical lens assembly, thereby reducing the optical aberration.

When 4.88<R5*R6/(f2*CT2)<40.13 is satisfied, it is conducive to preventing the radius of curvature from being too small, and to reducing the sensitivity to the assembly tolerance as the two radii of curvature are conditioned by each other.

When 5.29<R7/CT4<78.07 is satisfied, it is conducive to achieving a proper balance between the formability of the fourth lens and the image quality of the optical lens assembly.

When 2.58<CA4/(TDP3+TDP6)<10.54 is satisfied, it is conducive to achieving a proper balance between the formability of the second and third lenses and the image quality of the optical lens assembly.

When 5.27<R1/CT1<139.95 is satisfied, it is conducive to achieving a proper balance between the radius of curvature and the thickness of the first lens.

When 10.14 mm<(CT4*f1)/(CT2+CT3)<278.32 mm is satisfied, it is conducive to ensuring that the thickness of the lens device can meet the processing requirement of the manufacturing process of the optical lens assembly, while ensuring the image quality.

When 0.27<R1/f1<1.33 is satisfied, it is conducive to improving the distortion of the optical lens assembly, reducing the optical aberration of the optical lens assembly, and further reducing the size of the lens.

When −5.69 mm<(R1/R2)*CT1<1.16 mm is satisfied, it is conducive to preventing the radius of curvature from being too small, and to reducing the sensitivity to the assembly tolerance as the two radii of curvature are conditioned by each other.

When −1.07<R6/R5<2.24 mm is satisfied, it is conducive to preventing the radius of curvature from being too small, and to reducing the sensitivity to the assembly tolerance as the two radii of curvature are conditioned by each other.

Optionally, the optical lens assembly has a total of four lenses with refractive power.

Optionally, a distance from the visual-side surface of the first lens to an image source plane along the optical axis is TL, and the following condition is satisfied: 14.50 mm<TL<27.70 mm.

Optionally, a radius of a maximum internal circle of an effective luminous region of a display is IMH, and the following condition is satisfied: 10.64 mm<IMH<20.21 mm.

Optionally, the focal length of the optical lens assembly is f, and the following condition is satisfied: 14.03 mm<f<28.07 mm.

Optionally, a maximum field of view of the optical lens assembly is FOV, and the following condition is satisfied: 85.53°<FOV<107.85°.

Moreover, an electronic device in accordance with an embodiment of the present invention includes a housing, the aforementioned optical lens assembly disposed in the housing, an image source disposed on the image source plane of the optical lens assembly in the housing, and a controller disposed in the housing and electrically connected to the image source.

The present invention will be presented in further details from the following descriptions with the accompanying drawings, which show, for purpose of illustrations only, the preferred embodiments in accordance with the present invention.

DETAILED DESCRIPTION

First Embodiment

Figure 1A:
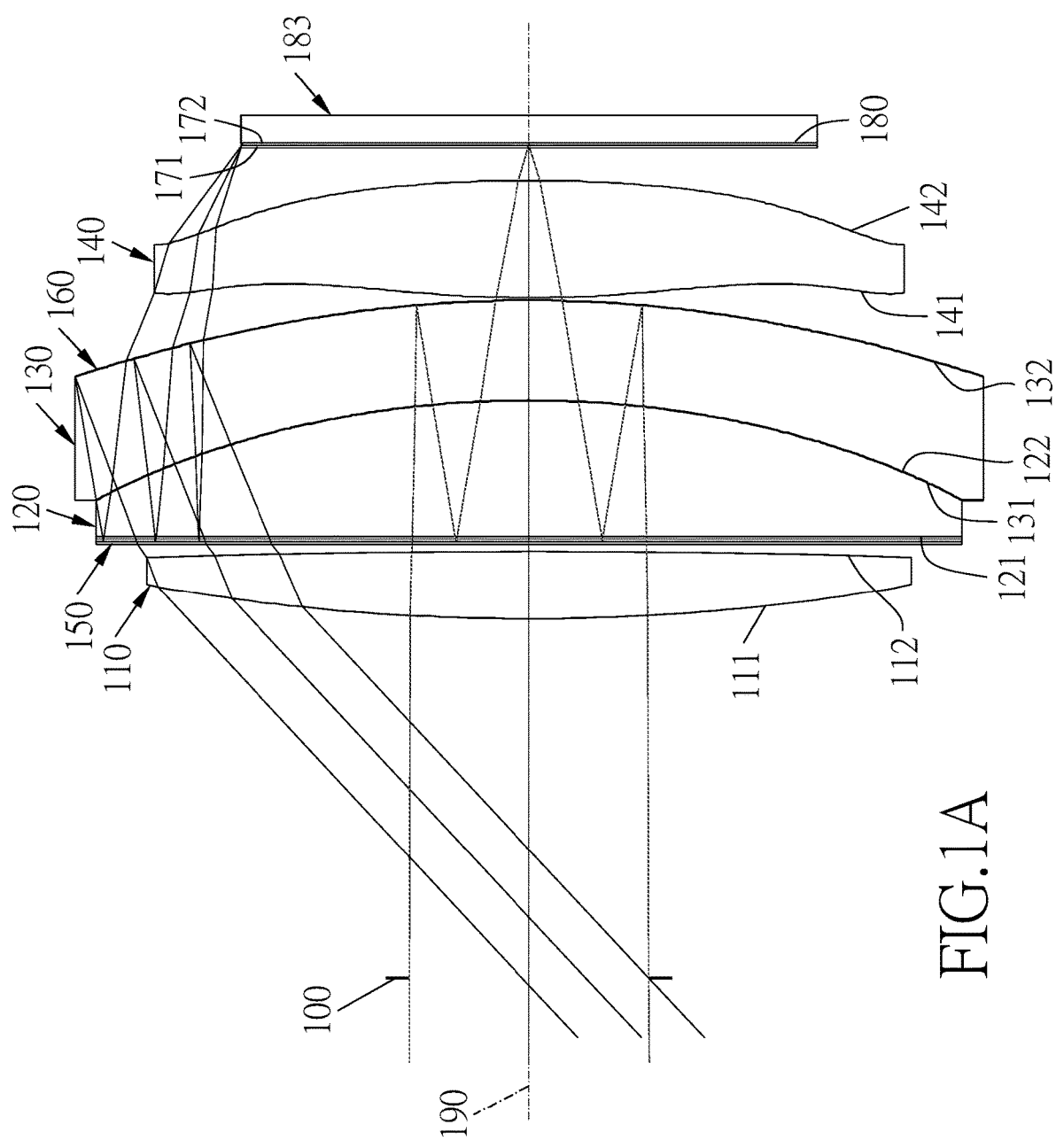
FIG. 1A is a schematic view of an optical lens assembly in accordance with a first embodiment of the present invention.
Figure 1B:
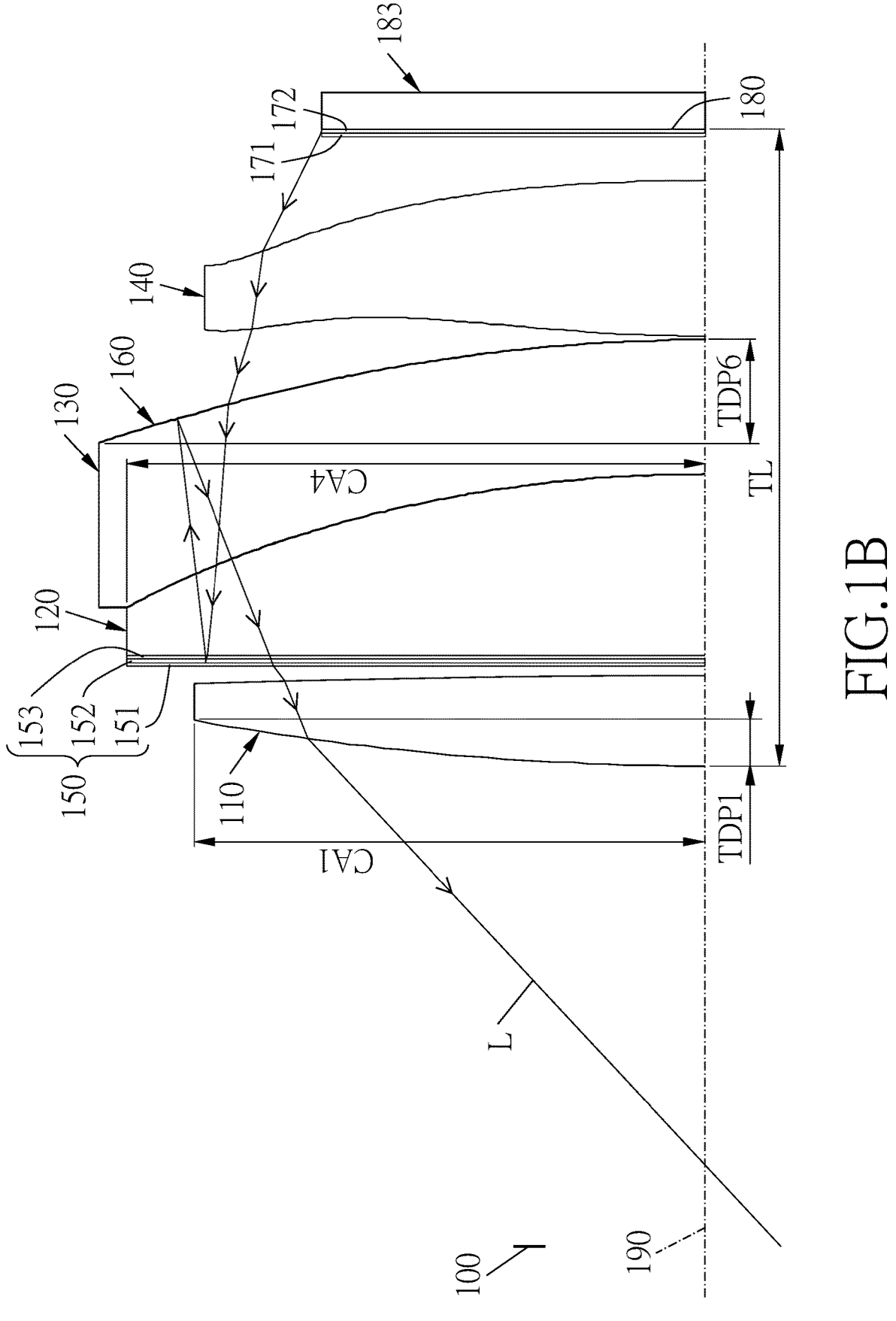
FIG. 1B is a schematic view of a light path of a chef ray in the optical lens assembly in FIG. 1A.

Referring to FIGS. 1A and 1B, an optical lens assembly in accordance with a first embodiment of the present invention includes, in order from a visual side to an image source side along an optical axis 190: a stop 100, a first lens 110, a first absorptive polarizer 151, a reflective polarizer 152, a first phase retarder 153, a second lens 120, a third lens 130, a partial-reflective-partial-transmissive element 160, a fourth lens 140, a second phase retarder 171, a second absorptive polarizer 172 and an image source plane 180. The optical lens assembly has, for example, but not limited to, a total of four lenses with refractive power. The first absorptive polarizer 151, the reflective polarizer 152 and the first phase retarder 153 form an optical element group 150.

The stop 100 may be located in a position where the user's eyes view an image.

The first lens 110 with positive refractive power includes a visual-side surface 111 and an image source-side 112, the visual-side surface 111 of the first lens 110 is convex in a paraxial region thereof, the image source-side surface 112 of the first lens 110 is convex in a paraxial region thereof, the visual-side surface 111 and the image source-side surface 112 of the first lens 110 are spherical, and the first lens 110 is made of plastic.

The second lens 120 with positive refractive power includes a visual-side surface 121 and an image source-side surface 122, the visual-side surface 121 of the second lens 120 is flat in a paraxial region thereof, the image source-side surface 122 of the second lens 120 is convex in a paraxial region thereof, the visual-side surface 121 of the second lens 120 is spherical, the image source-side surface 122 of the second lens 120 is aspheric, and the second lens 120 is made of plastic.

The third lens 130 with negative refractive power includes a visual-side surface 131 and an image source-side surface 132, the visual-side surface 131 of the third lens 130 is concave in a paraxial region thereof, the image source-side surface 132 of the third lens 130 is convex in a paraxial region thereof, the visual-side surface 131 and the image source-side surface 132 of the third lens 130 are aspheric, and the third lens 130 is made of plastic. The second lens 120 and the third lens 130 together form a cemented doublet lens.

The fourth lens 140 with positive refractive power includes a visual-side surface 141 and an image source-side surface 142, the visual-side surface 141 of the fourth lens 140 is convex in a paraxial region thereof, the image source-side surface 142 of the fourth lens 140 is convex in a paraxial region thereof, the visual-side surface 141 and the image source-side surface 142 of the fourth lens 140 are aspheric, and the fourth lens 140 is made of plastic.

The first absorptive polarizer 151 is disposed on a visual-side surface of the reflective polarizer 152, the reflective polarizer 152 is disposed on a visual-side surface of the first phase retarder 153, and the first phase retarder 153 is disposed on the visual-side surface 121 of the second lens 120. The first phase retarder 153 is, for example, but not limited to, a quarter-wave plate.

The partial-reflective-partial-transmissive element 160 is disposed on the image source-side surface 132 of the third lens 130 and has an average reflectance of at least 30%, preferably 50%, in the wavelength range of visible light. The average reflectance here is an average value of different reflectance of the partial-reflective-partial-transmissive element 160 for different wavelengths.

The second phase retarder 171 is disposed on a visual-side surface of the second absorptive polarizer 172, and the second absorptive polarizer 172 is disposed on the image source plane 180. The second phase retarder 171 is, for example, but not limited to, a quarter-wave plate.

The optical lens assembly works in cooperation with an image source 183 disposed on the image source plane 180. In the present embodiment, the type of the image source 183 is, for example, but not limited to, an OLED display, a LED display, a liquid crystal display, or other displays.

The curve equation for the aspheric surface profiles of the respective lenses of the first embodiment is expressed as follows:

$$z(h) = \frac{ch^2}{1 + \left[1 - (k+1)c^2h^2\right]^{0.5}} + \sum (A_i) \cdot \left(h^i\right)$$

wherein:
z represents the value of a reference position at a height of h with respect to a vertex of the surface of a lens along the optical axis 190;
c represents a paraxial curvature (i.e., a curvature of a lens surface in a paraxial region thereof) equal to 1/R (R: a paraxial radius of curvature);

h represents a vertical distance from the point on the curve of the aspheric surface to the optical axis 190;
k represents the conic constant; and
Ai represents the i-th order aspheric coefficient.

The optical lens assembly of the first embodiment utilizes the configuration and arrangement of the absorptive polarizer, the reflective polarizer, the phase retarders, the partial-reflective-partial-transmissive element and the lenses to fold the light path thereof by the transmission and reflection of light to shorten the length of the optical lens assembly required for forming an image without affecting the image quality. In a light path L in FIG. 1B, a linearly-polarized beam from the image source 183 turns to a circularly-polarized beam after passing through the second absorptive polarizer 172 and the second phase retarder 171. After the circularly-polarized beam passes through the fourth lens 140, a component of the circularly-polarized beam serving as circularly-polarized transmission light passes through the partial-reflective-partial-transmissive element 160, and then passes through the third lens 130, the second lens 120 and the first phase retarder 153 sequentially to turn to linearly-polarized transmission light. Then, this linearly-polarized transmission light is reflected by the reflective polarizer 152 and passes through the first phase retarder 153 to turn to circularly-polarized transmission light. After passing through the second lens 120 and the third lens 130, a component of the circularly-polarized transmission light, serving as circularly-polarized reflection light is reflected by the partial-reflective-partial-transmissive element 160 and then passes through the third lens 130, the second lens 120 and the first phase retarder 153 sequentially to turn to linearly-polarized reflection light. Finally, the linearly-polarized reflection light transmits to the user's eyes after passing through the reflective polarizer 152, the first absorptive polarizer 151 and the first lens 110 sequentially, so as to form an image.

Please refer to Tables 1-4, Table 1 shows the detailed optical data of the elements of the optical lens assembly of the first embodiment, Table 2 shows the aspheric coefficients of the aspherical surfaces of the elements of the optical lens assembly of the first embodiment, Table 3 shows the remaining parameters of the optical lens assembly of the first embodiment and the values thereof, and the values of the parameters in Tables 1 and 3 meet the formulas of Table 4. A maximum effective radius of the visual-side surface 111 of the first lens 110 is CA1, a maximum effective radius of the image source-side surface 122 of the second lens 120 is CA4, a thickness of the first lens 110 along the optical axis 190 is CT1, a thickness of the second lens 120 along the optical axis 190 is CT2, a thickness of the third lens 130 along the optical axis 190 is CT3, a thickness of the fourth lens 140 along the optical axis 190 is CT4, an absolute value of a displacement in parallel to the optical axis 190 from an intersection between the visual-side surface 111 of the first lens 110 and the optical axis 190 to the maximum effective radius position on the visual-side surface 111 of the first lens 110 is TDP1, an absolute value of a displacement in parallel to the optical axis 190 from an intersection between the visual-side surface 121 of the second lens 120 and the optical axis 190 to a maximum effective radius position on the visual-side surface 121 of the second lens 120 is TDP3, an absolute value of a displacement in parallel to the optical axis 190 from an intersection between the image source-side surface 132 of the third lens 130 and the optical axis 190 to a maximum effective radius position on the image source-side surface 132 of the third lens 130 is TDP6.

TABLE 1

Embodiment 1
f = 16.12 mm, EPD = 10.00 mm, FOV = 90.11°

| Surface | | Radius of curvature | Thickness/ gap | Refractive index (nd) | Abbe number (vd) | Refraction/ reflection |
|---|---|---|---|---|---|---|
| 0 | Stop | Infinity | 15.000 | — | — | — |
| 1 | First lens | 97.124 | 2.626 | 1.544 | 55.9 | Refraction |
| 2 | | −584.008 | 0.300 | — | — | Refraction |
| 3 | First absorptive polarizer | Infinity | 0.100 | 1.533 | 56.0 | Refraction |
| 4 | Reflective polarizer | Infinity | 0.100 | 1.533 | 56.0 | Refraction |
| 5 | First phase retarder | Infinity | 0.100 | 1.533 | 56.0 | Refraction |
| 6 | Second lens | Infinity | 5.296 | 1.544 | 55.9 | Refraction |
| 7 | Third lens | −47.698 | 3.917 | 1.645 | 23.4 | Refraction |
| 8 | Partial-reflective-partial-transmissive element | −59.150 | −3.917 | | Mirror | Reflection |
| 9 | Second lens | −47.698 | −5.296 | 1.544 | 55.9 | Refraction |
| 10 | First phase retarder | Infinity | −0.100 | 1.533 | 56.0 | Refraction |
| 11 | Reflective polarizer | Infinity | −0.100 | 1.533 | 56.0 | Refraction |
| 12 | | Infinity | 0.100 | | Mirror | Reflection |
| 13 | First phase retarder | Infinity | 0.100 | 1.533 | 56.0 | Refraction |
| 14 | Second lens | Infinity | 5.296 | 1.544 | 55.9 | Refraction |
| 15 | Third lens | −47.698 | 3.917 | 1.645 | 23.4 | Refraction |
| 16 | Partial-reflective-partial-transmissive element | −59.150 | 0.100 | — | — | Refraction |
| 17 | Fourth lens | 49.609 | 4.564 | 1.544 | 55.9 | Refraction |
| 18 | | −73.962 | 1.300 | — | — | Refraction |
| 19 | Second phase retarder | Infinity | 0.100 | 1.533 | 56.0 | Refraction |
| 20 | Second absorptive polarizer | Infinity | 0.100 | 1.533 | 56.0 | Refraction |
| 21 | Image source | Infinity | — | — | — | — |

The reference wavelength is 555 nm.

TABLE 2

Embodiment 1
Aspheric Coefficients

| Surface | 1 | 2 | 6, 10, 14 | 7, 9, 15 |
|---|---|---|---|---|
| K: | 0.0000E+00 | 0.0000E+00 | 0.0000E+00 | 9.5919E−01 |
| A2: | 0.0000E+00 | 0.0000E+00 | 0.0000E+00 | 0.0000E+00 |
| A4: | 0.0000E+00 | 0.0000E+00 | 0.0000E+00 | −4.7909E−07 |
| A6: | 0.0000E+00 | 0.0000E+00 | 0.0000E+00 | −1.2233E−09 |
| A8: | 0.0000E+00 | 0.0000E+00 | 0.0000E+00 | −2.2579E−12 |
| A10: | 0.0000E+00 | 0.0000E+00 | 0.0000E+00 | −4.4304E−15 |
| A12: | 0.0000E+00 | 0.0000E+00 | 0.0000E+00 | −9.6555E−18 |
| A14: | 0.0000E+00 | 0.0000E+00 | 0.0000E+00 | −2.3078E−20 |
| A16: | 0.0000E+00 | 0.0000E+00 | 0.0000E+00 | −5.9811E−23 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

| Surface | 8, 16 | 17 | 18 | — |
|---|---|---|---|---|
| K: | −7.6464E−01 | 0.0000E+00 | 0.0000E+00 | — |
| A2: | 0.0000E+00 | 0.0000E+00 | 0.0000E+00 | — |
| A4: | 1.3418E−07 | −4.3441E−05 | −1.8035E−05 | — |
| A6: | 6.0524E−10 | −4.9366E−08 | −3.2572E−08 | — |

TABLE 2-continued

Embodiment 1
Aspheric Coefficients

| A8: | 7.5774E−13 | 2.8637E−11 | −9.1961E−11 | — |
|---|---|---|---|---|
| A10: | −2.9088E−16 | −6.2651E−15 | 4.2845E−13 | — |
| A12: | 5.2367E−18 | 3.7633E−15 | 7.0771E−16 | — |
| A14: | 1.1345E−20 | −2.7358E−19 | 1.1009E−17 | — |
| A16: | 7.4486E−24 | 6.6983E−21 | −4.0872E−21 | — |
| A18: | 0.0000E+00 | 0.0000E+00 | 0.0000E+00 | — |
| A20: | 0.0000E+00 | 0.0000E+00 | 0.0000E+00 | — |

TABLE 3

Embodiment 1

| f1 [mm] | 152.82 | CA1 [mm] | 16.35 | TDP6 [mm] | 3.08 |
|---|---|---|---|---|---|
| f2 [mm] | 87.41 | CA4 [mm] | 18.38 | IMH [mm] | 12.00 |
| f3 [mm] | −441.66 | TDP1 [mm] | 1.39 | — | — |
| f4 [mm] | 55.13 | TDP3 [mm] | 0.00 | — | — |

TABLE 4

Embodiment 1

| CT3/TDP6 | 1.27 | f1/CT1 | 58.19 | R1/CT1 | 36.98 |
|---|---|---|---|---|---|
| CA1/TDP1 | 11.79 | (f2/CT1) + (f1/CT2) | 62.14 | (CT4*f1)/(CT2 + CT3) [mm] | 75.70 |
| f3/R6 | 7.47 | f1/f2 | 1.75 | R1/f1 | 0.64 |
| f1/f | 9.48 | R5*R6/(f2*CT2) | 6.09 | (R1/R2)*CT1 [mm] | −0.44 |
| f2/CT2 | 16.51 | R7/CT4 | 10.87 | R6/R5 | 1.24 |
| (f3/CT3) + (f4/CT4) | −100.68 | CA4/(TDP3 + TDP6) | 5.97 | — | — |

In Table 1, the units of the radius of curvature, the thickness, the gap and the focal length are expressed in mm, and the surface numbers 21-0 respectively represent the surfaces through which the light sequentially transmits from the image source plane 180 to the stop 100 along the light path L, wherein the surface 0 represents a gap between the stop 100 (or the user's eyes) and the first lens 110 along the optical axis 190; the surface 1 represents the thickness of the first lens 110 along the optical axis 190; the surface 2 represents a gap between the first lens 110 and the first absorptive polarizer 151 along the optical axis 190, the surface 3 represents the thickness of the first absorptive polarizer 151 along the optical axis 190; the surfaces 4, 11 and 12 represent the thickness of the reflective polarizer 152 along the optical axis 190; the surfaces 5, 10 and 13 represent the thickness of the first phase retarder 153 along the optical axis 190; the surfaces 6, 9 and 14 represent the thickness of the second lens 120 along the optical axis 190; the surfaces 7 and 15 represent the thickness of the third lens 130 along the optical axis 190; the surface 8 represents a gap between the image source-side surface 132 of the third lens 130 and the image source-side surface 122 of the second lens 120 along the optical axis 190, and this gap is equivalent to the thickness of the third lens 130 along the optical axis 190; the surface 16 represents a gap between the visual-side surface 141 of the fourth lens 140 and the image source-side surface 132 of the third lens 130 along the optical axis 190; the surface 17 represents the thickness of the fourth lens 140 along the optical axis 190; the surface 18 represents a gap between the fourth lens 140 and the second phase retarder 171 along the optical axis 190; the surface 19 represents the thickness of the second phase retarder 171 along the optical axis 190; and the surface 20 represent the thickness of the second absorptive polarizer 172 along the optical axis 190. The gaps and thicknesses having a positive sign in Table 1 denote the transmission direction of light is toward the stop 100, and the gaps and thicknesses having a negative sign in Table 1 denote the transmission direction of light is toward the image source plane 180.

In table 2, k represents the conic constant of the equation of aspheric surface profiles, and A2, A4, A6, A8, A10, A12, A14, A16, A18, and A20 represent the high-order aspheric coefficients.

The respective tables presented below for respective one of other embodiments are based on the schematic view of this embodiment, and the definitions of parameters in the tables are the same as those in Tables 1-4 of the first embodiment. However, the definition of each surface number in Table 1 varies with the number of the lenses and the position of the optical elements, and the relevant description of the embodiments may be referred to the definition of each surface number in Table 1. Therefore, an explanation in this regard will not be provided again.

Second Embodiment

Figure 2:
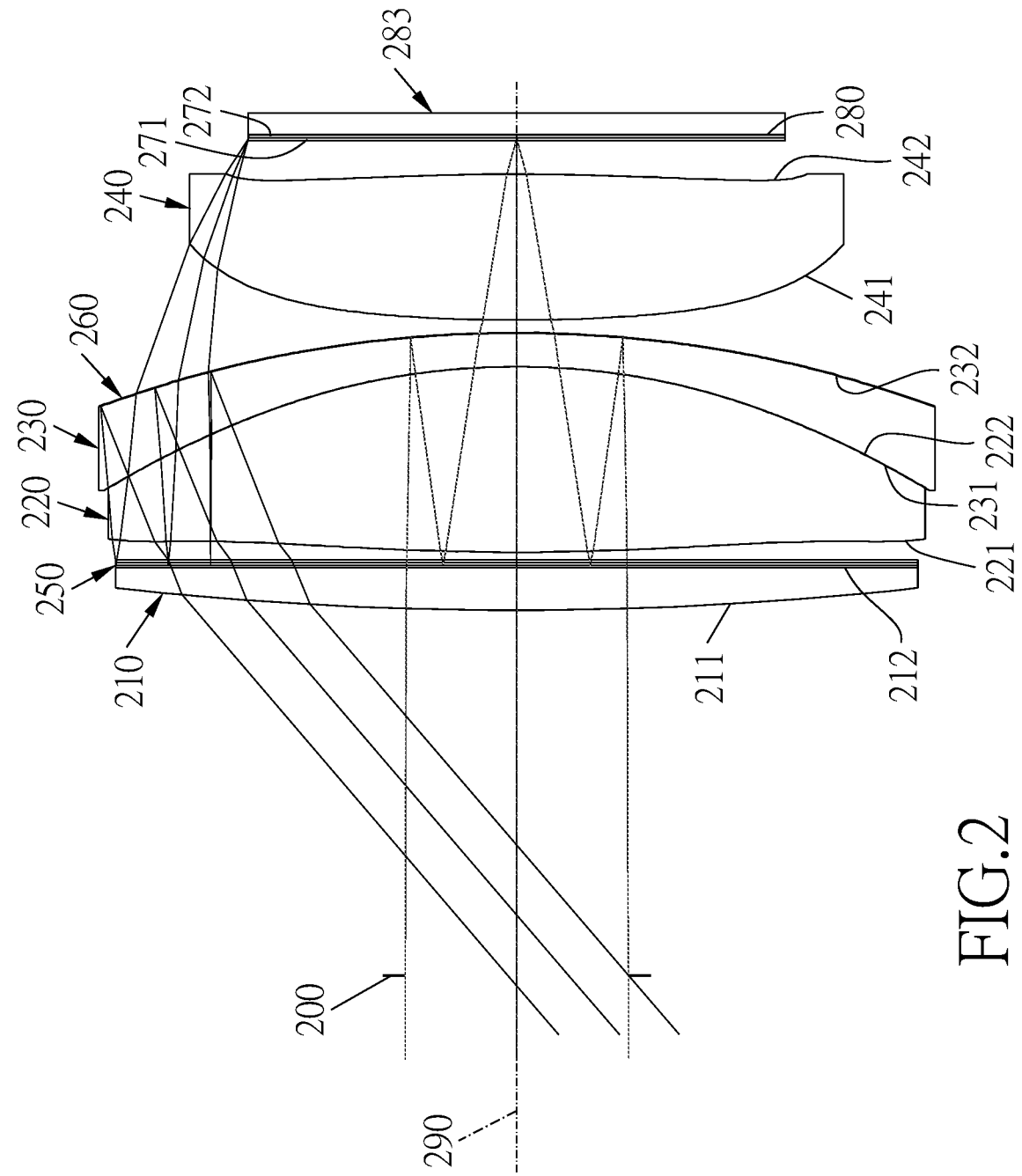
FIG. 2 is a schematic view of an optical lens assembly in accordance with a second embodiment of the present invention.

Referring to FIG. 2, an optical lens assembly in accordance with a second embodiment of the present invention includes, in order from a visual side to an image source side along an optical axis 290: a stop 200, a first lens 210, a first absorptive polarizer, a reflective polarizer, a first phase retarder, a second lens 220, a third lens 230, a partial-reflective-partial-transmissive element 260, a fourth lens 240, a second phase retarder 271, a second absorptive polarizer 272 and an image source plane 280. The optical lens assembly has, for example, but not limited to, a total of four lenses with refractive power. The first absorptive polarizer, the reflective polarizer and the first phase retarder form an optical element group 250.

The first lens 210 with positive refractive power includes a visual-side surface 211 and an image source-side 212, the visual-side surface 211 of the first lens 210 is convex in a paraxial region thereof, the image source-side surface 212 of the first lens 210 is flat in a paraxial region thereof, the visual-side surface 211 of the first lens 210 is spherical, and the first lens 210 is made of plastic.

The second lens 220 with positive refractive power includes a visual-side surface 221 and an image source-side surface 222, the visual-side surface 221 of the second lens 220 is convex in a paraxial region thereof, the image source-side surface 222 of the second lens 220 is convex in a paraxial region thereof, the visual-side surface 221 and the image source-side surface 222 of the second lens 220 are aspheric, and the second lens 220 is made of plastic.

The third lens 230 with negative refractive power includes a visual-side surface 231 and an image source-side surface 232, the visual-side surface 231 of the third lens 230 is concave in a paraxial region thereof, the image source-side surface 232 of the third lens 230 is convex in a paraxial region thereof, the visual-side surface 231 and the image source-side surface 232 of the third lens 230 are aspheric, and the third lens 230 is made of plastic. The second lens 220 and the third lens 230 together form a cemented doublet lens.

The fourth lens 240 with positive refractive power includes a visual-side surface 241 and an image source-side surface 242, the visual-side surface 241 of the fourth lens 240 is convex in a paraxial region thereof, the image source-side surface 242 of the fourth lens 240 is convex in a paraxial region thereof, the visual-side surface 241 and the image source-side surface 242 of the fourth lens 240 are aspheric, and the fourth lens 240 is made of plastic.

The first absorptive polarizer is disposed on the image source-side surface 212 of the first lens 210, the reflective polarizer is disposed on an image source-side surface of the first absorptive polarizer, and the first phase retarder is disposed on an image source-side surface of the reflective polarizer. The first phase retarder is, for example, but not limited to, a quarter-wave plate.

The optical lens assembly works in cooperation with an image source 283 disposed on the image source plane 280.

The configurations of the stop 200, the partial-reflective-partial-transmissive element 260, the second phase retarder 271 and the second absorptive polarizer 272 and the type of the image source 283 may refer to those of the stop 100, the partial-reflective-partial-transmissive element 160, the second phase retarder 171, the second absorptive polarizer 172 and the image source 183 of the first embodiment and will not be explained again.

Please refer to Tables 5-8, Table 5 shows the detailed optical data of the elements of the optical lens assembly of the second embodiment, Table 6 shows the data of the aspherical surfaces of the lenses of the optical lens assembly of the second embodiment, Table 7 shows the remaining parameters of the optical lens assembly of the second embodiment and the values thereof, and the values of the parameters in Tables 5 and 7 meet the formulas of Table 8. In the second embodiment, the equation of the aspheric surface profiles of the aforementioned lenses is the same as the equation of the aspheric surface profiles of the afore-mentioned lenses in the first embodiment. The definitions of the surfaces in Table 5 can be referred to the relevant description of Table 1 and will not be explained again.

TABLE 5

Embodiment 2
f = 16.67 mm, EPD = 10.00 mm, FOV = 90.19°

| Surface | | Radius of curvature | Thickness/ gap | Refractive index (nd) | Abbe number (vd) | Refraction/ reflection |
|---|---|---|---|---|---|---|
| 0 | Stop | Infinity | 15.000 | — | — | — |
| 1 | First lens | 190.247 | 1.631 | 1.544 | 55.9 | Refraction |
| 2 | First absorptive polarizer | Infinity | 0.100 | 1.533 | 56.0 | Refraction |
| 3 | Reflective polarizer | Infinity | 0.100 | 1.533 | 56.0 | Refraction |
| 4 | First phase retarder | Infinity | 0.100 | 1.533 | 56.0 | Refraction |
| 5 | | Infinity | 0.300 | — | — | Refraction |
| 6 | Second lens | 140.647 | 7.107 | 1.544 | 55.9 | Refraction |
| 7 | Third lens | −39.048 | 1.297 | 1.645 | 23.4 | Refraction |
| 8 | Partial-reflective- partial-transmissive element | −65.279 | −1.297 | Mirror | | Reflection |
| 9 | Second lens | −39.048 | −7.107 | 1.544 | 55.9 | Refraction |
| 10 | | Infinity | −0.300 | — | — | Refraction |
| 11 | First phase retarder | Infinity | −0.100 | 1.533 | 56.0 | Refraction |
| 12 | Reflective polarizer | Infinity | −0.100 | 1.533 | 56.0 | Refraction |
| 13 | | Infinity | 0.100 | Mirror | | Reflection |
| 14 | First phase retarder | Infinity | 0.100 | 1.533 | 56.0 | Refraction |
| 15 | | Infinity | 0.300 | — | — | Refraction |
| 16 | Second lens | 140.647 | 7.107 | 1.544 | 55.9 | Refraction |
| 17 | Third lens | −39.048 | 1.297 | 1.645 | 23.4 | Refraction |
| 18 | Partial-reflective- partial-transmissive element | −65.279 | 0.500 | — | — | Refraction |
| 19 | Fourth lens | 107.314 | 5.591 | 1.544 | 55.9 | Refraction |
| 20 | | −129.807 | 1.320 | | | Refraction |
| 21 | Second phase retarder | Infinity | 0.100 | 1.533 | 56.0 | Refraction |
| 22 | Second absorptive polarizer | Infinity | 0.100 | 1.533 | 56.0 | Refraction |
| 23 | Image source | Infinity | — | — | — | — |

The reference wavelength is 555 nm.

TABLE 6

Embodiment 2
Aspheric Coefficients

| Surface | 1 | 2 | 6, 10, 14 | 7, 9, 17 |
|---|---|---|---|---|
| K: | 0.0000E+00 | 0.0000E+00 | −7.0768E+01 | 9.0845E−01 |
| A2: | 0.0000E+00 | 0.0000E+00 | 0.0000E+00 | 0.0000E+00 |
| A4: | 0.0000E+00 | 0.0000E+00 | −5.3603E−07 | −6.1277E−06 |
| A6: | 0.0000E+00 | 0.0000E+00 | −1.8963E−08 | 2.4825E−08 |
| A8: | 0.0000E+00 | 0.0000E+00 | −5.3612E−11 | 5.2264E−11 |
| A10: | 0.0000E+00 | 0.0000E+00 | 4.7378E−15 | −1.0291E−13 |
| A12: | 0.0000E+00 | 0.0000E+00 | 5.7775E−16 | −4.1634E−16 |
| A14: | 0.0000E+00 | 0.0000E+00 | 1.9750E−18 | 1.2950E−19 |
| A16: | 0.0000E+00 | 0.0000E+00 | −4.9360E−21 | 1.8232E−21 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

| Surface | 8, 18 | 19 | 20 | — |
|---|---|---|---|---|
| K: | −3.2138E−01 | 0.0000E+00 | 0.0000E+00 | — |
| A2: | 0.0000E+00 | 0.0000E+00 | 0.0000E+00 | — |
| A4: | 8.1039E−08 | 2.5516E−05 | 2.2141E−05 | — |
| A6: | −2.8472E−09 | −9.3999E−08 | −1.0569E−07 | — |

TABLE 6-continued

Embodiment 2
Aspheric Coefficients

| A8: | −6.5368E−12 | 1.1042E−09 | 2.2398E−10 | — |
|---|---|---|---|---|
| A10: | −1.6209E−15 | −4.5361E−13 | 2.1706E−12 | — |
| A12: | 2.2015E−17 | −1.0898E−14 | −5.2990E−15 | — |
| A14: | 5.7889E−20 | −1.3677E−17 | −1.2181E−16 | — |
| A16: | 2.4395E−22 | 1.9096E−19 | 9.6107E−19 | — |
| A18: | 0.0000E+00 | 0.0000E+00 | 0.0000E+00 | — |
| A20: | 0.0000E+00 | 0.0000E+00 | 0.0000E+00 | — |

TABLE 7

Embodiment 2

| f1 [mm] | 348.64 | CA1 [mm] | 15.51 | TDP6 [mm] | 2.79 |
|---|---|---|---|---|---|
| f2 [mm] | 56.80 | CA4 [mm] | 18.27 | IMH [mm] | 12.00 |
| f3 [mm] | −153.85 | TDP1 [mm] | 0.63 | — | — |
| f4 [mm] | 108.56 | TDP3 [mm] | 0.48 | — | — |

TABLE 8

Embodiment 2

| CT3/TDP6 | 0.46 | f1/CT1 | 213.72 | R1/CT1 | 116.62 |
|---|---|---|---|---|---|
| CA1/TDP1 | 24.50 | (f2/CT1) + (f1/CT2) | 83.88 | (CT4*f1)/(CT2 + CT3) [mm] | 231.93 |
| f3/R6 | 2.36 | f1/f2 | 6.14 | R1/f1 | 0.55 |
| f1/f | 20.91 | R5*R6/(f2*CT2) | 6.31 | (R1/R2)*CT1 [mm] | 0.00 |
| f2/CT2 | 7.99 | R7/CT4 | 19.19 | R6/R5 | 1.67 |
| (f3/CT3) + (f4/CT4) | −99.17 | CA4/(TDP3 + TDP6) | 5.59 | — | — |

Third Embodiment

Figure 3:
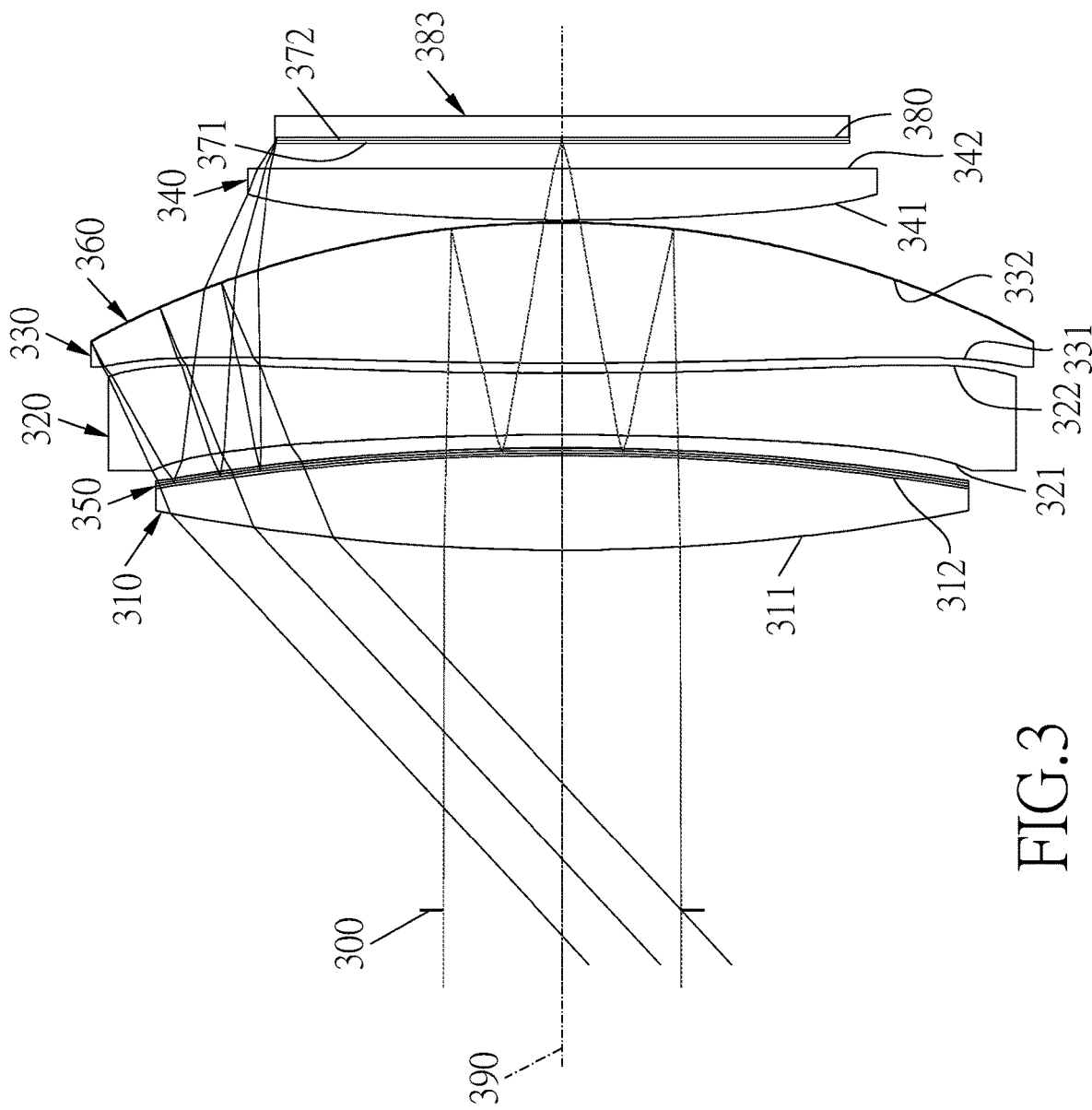
FIG. 3 is a schematic view of an optical lens assembly in accordance with a third embodiment of the present invention.

Referring to FIG. 3, an optical lens assembly in accordance with a third embodiment of the present invention includes, in order from a visual side to an image source side along an optical axis 390: a stop 300, a first lens 310, a first absorptive polarizer, a reflective polarizer, a first phase retarder, a second lens 320, a third lens 330, a partial-reflective-partial-transmissive element 360, a fourth lens 340, a second phase retarder 371, a second absorptive polarizer 372 and an image source plane 380. The optical lens assembly has, for example, but not limited to, a total of four lenses with refractive power. The first absorptive polarizer, the reflective polarizer and the first phase retarder form an optical element group 350.

The first lens 310 with positive refractive power includes a visual-side surface 311 and an image source-side 312, the visual-side surface 311 of the first lens 310 is convex in a paraxial region thereof, the image source-side surface 312 of the first lens 310 is convex in a paraxial region thereof, the visual-side surface 311 and the image source-side surface 312 of the first lens 310 are spherical, and the first lens 310 is made of plastic.

The second lens 320 with negative refractive power includes a visual-side surface 321 and an image source-side surface 322, the visual-side surface 321 of the second lens 320 is concave in a paraxial region thereof, the image source-side surface 322 of the second lens 320 is concave in a paraxial region thereof, the visual-side surface 321 and the image source-side surface 322 of the second lens 320 are aspheric, and the second lens 320 is made of plastic.

The third lens 330 with positive refractive power includes a visual-side surface 331 and an image source-side surface 332, the visual-side surface 331 of the third lens 330 is convex in a paraxial region thereof, the image source-side surface 332 of the third lens 330 is convex in a paraxial region thereof, the visual-side surface 331 and the image source-side surface 332 of the third lens 330 are aspheric, and the third lens 330 is made of plastic.

The fourth lens 340 with positive refractive power includes a visual-side surface 341 and an image source-side surface 342, the visual-side surface 341 of the fourth lens 340 is convex in a paraxial region thereof, the image source-side surface 342 of the fourth lens 340 is flat in a paraxial region thereof, the visual-side surface 341 of the fourth lens 340 is aspheric, and the fourth lens 340 is made of plastic.

The optical lens assembly works in cooperation with an image source 383 disposed on the image source plane 380.

The configurations of the stop 300, the partial-reflective-partial-transmissive element 360, the second phase retarder 371 and the second absorptive polarizer 372 and the type of the image source 383 may refer to those of the stop 100, the partial-reflective-partial-transmissive element 160, the second phase retarder 171, the second absorptive polarizer 172 and the image source 183 of the first embodiment, and the configuration of the optical element group 350 may refer to that of the optical element group 250 of the second embodiment and will not be explained again.

Please refer to Tables 9-12, Table 9 shows the detailed optical data of the elements of the optical lens assembly of the third embodiment, Table 10 shows the data of the aspherical surfaces of the lenses of the optical lens assembly of the third embodiment, Table 11 shows the remaining parameters of the optical lens assembly of the third embodiment and the values thereof, and the values of the parameters in Tables 9 and 11 meet the formulas of Table 12. In the third embodiment, the equation of the aspheric surface profiles of the aforementioned lenses is the same as the equation of the aspheric surface profiles of the aforementioned lenses in the first embodiment. The definitions of the surfaces in Table 9 can be referred to the relevant description of Table 1 and will not be explained again.

TABLE 9

| | | Radius of curvature | Thickness/ gap | Refractive index (nd) | Abbe number (vd) | Refraction/ reflection |
|---|---|---|---|---|---|---|
| | | Embodiment 3 f = 16.57 mm, EPD = 10.00 mm, FOV = 90.06° | | | | |
| Surface | | | | | | |
| 0 | Stop | Infinity | 14.000 | — | — | — |
| 1 | First lens | 96.100 | 3.692 | 1.544 | 55.9 | Refraction |
| 2 | First absorptive polarizer | −113.618 | 0.100 | 1.533 | 56.0 | Refraction |
| 3 | Reflective polarizer | −113.618 | 0.100 | 1.533 | 56.0 | Refraction |
| 4 | First phase retarder | −113.618 | 0.100 | 1.533 | 56.0 | Refraction |
| 5 | | −113.618 | 0.500 | — | — | Refraction |
| 6 | Second lens | −188.088 | 2.413 | 1.645 | 23.4 | Refraction |
| 7 | | 265.980 | 0.400 | — | — | Refraction |
| 8 | Third lens | 304.196 | 5.498 | 1.544 | 55.9 | Refraction |
| 9 | Partial-reflective-partial-transmissive element | −45.276 | −5.498 | 1.544 | 55.9 | Reflection |
| 10 | | 304.196 | −0.400 | — | — | Refraction |
| 11 | Second lens | 265.980 | −2.413 | 1.645 | 23.4 | Refraction |
| 12 | | −188.088 | −0.500 | — | — | Refraction |
| 13 | First phase retarder | −113.618 | −0.100 | 1.533 | 56.0 | Refraction |
| 14 | Reflective polarizer | −113.618 | −0.100 | 1.533 | 56.0 | Refraction |
| 15 | | −113.618 | 0.100 | 1.533 | 56.0 | Reflection |
| 16 | First phase retarder | −113.618 | 0.100 | 1.533 | 56.0 | Refraction |
| 17 | | −113.618 | 0.500 | — | — | Refraction |
| 18 | Second lens | −188.088 | 2.413 | 1.645 | 23.4 | Refraction |
| 19 | | 265.980 | 0.400 | — | — | Refraction |
| 20 | Third lens | 304.196 | 5.498 | 1.544 | 55.9 | Refraction |
| 21 | Partial-reflective-partial-transmissive element | −45.276 | 0.100 | — | — | Refraction |

TABLE 9-continued

| | | | | | | |
|---|---|---|---|---|---|---|
| | | Embodiment 3 | | | | |
| | | f = 16.57 mm, EPD = 10.00 mm, FOV = 90.06° | | | | |
| Surface | | Radius of curvature | Thickness/ gap | Refractive index (nd) | Abbe number (vd) | Refraction/ reflection |
| 22 | Fourth lens | 130.588 | 2.010 | 1.544 | 55.9 | Refraction |
| 23 | | Infinity | 1.000 | — | — | Refraction |
| 24 | Second phase retarder | Infinity | 0.100 | 1.533 | 56.0 | Refraction |
| 25 | Second absorptive polarizer | Infinity | 0.100 | 1.533 | 56.0 | Refraction |
| 26 | Image source | Infinity | — | — | — | — |

The reference wavelength is 555 nm.

TABLE 10

| | | | | |
|---|---|---|---|---|
| | | Embodiment 3 | | |
| | | Aspheric Coefficients | | |
| Surface | 1 | 2 | 6, 12, 18 | 7, 11, 19 |
| K: | 0.0000E+00 | 0.0000E+00 | 1.1747E+01 | 8.0000E+01 |
| A2: | 0.0000E+00 | 0.0000E+00 | 0.0000E+00 | 0.0000E+00 |
| A4: | 0.0000E+00 | 0.0000E+00 | -1.3132E-06 | -4.2120E-07 |
| A6: | 0.0000E+00 | 0.0000E+00 | -2.8537E-09 | -5.3408E-09 |
| A8: | 0.0000E+00 | 0.0000E+00 | -1.0225E-11 | -1.2929E-11 |
| A10: | 0.0000E+00 | 0.0000E+00 | -3.1424E-14 | -2.7152E-14 |
| A12: | 0.0000E+00 | 0.0000E+00 | -1.1568E-16 | -4.9506E-17 |
| A14: | 0.0000E+00 | 0.0000E+00 | -3.9003E-19 | -8.4747E-20 |
| A16: | 0.0000E+00 | 0.0000E+00 | -1.0749E-21 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |
| Surface | 8, 10, 22 | 9, 21 | 22 | 23 |
| K: | 8.0000E+01 | 0.0000E+00 | 9.0000E+01 | 0.0000E+00 |
| A2: | 0.0000E+00 | 0.0000E+00 | 0.0000E+00 | 0.0000E+00 |
| A4: | -1.5741E-06 | 1.8329E-07 | 2.6978E-05 | 0.0000E+00 |
| A6: | -5.3539E-09 | -2.0887E-09 | -5.1252E-07 | 0.0000E+00 |
| A8: | -1.0367E-11 | 4.0421E-12 | 2.1450E-09 | 0.0000E+00 |
| A10: | -8.7508E-15 | -3.4775E-15 | 5.5610E-12 | 0.0000E+00 |
| A12: | -3.7607E-18 | -1.3738E-17 | -2.8064E-14 | 0.0000E+00 |
| A14: | -4.8196E-20 | 0.0000E+00 | -5.2128E-17 | 0.0000E+00 |
| A16: | 0.0000E+00 | 0.0000E+00 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

TABLE 11

| | | | | | |
|---|---|---|---|---|---|
| | | Embodiment 3 | | | |
| f1 [mm] | 96.01 | CA1 [mm] | 16.45 | TDP6 [mm] | 4.65 |
| f2 [mm] | -170.69 | CA4 [mm] | 18.94 | IMH [mm] | 12.00 |
| f3 [mm] | 72.63 | TDP1 [mm] | 1.42 | — | — |
| f4 [mm] | 239.31 | TDP3 [mm] | 1.22 | — | — |

TABLE 12

| | | | | | |
|---|---|---|---|---|---|
| | | Embodiment 3 | | | |
| CT3/TDP6 | 1.18 | f1/CT1 | 26.00 | R1/CT1 | 26.03 |
| CA1/TDP1 | 11.60 | (f2/CT1) + (f1/CT2) | -6.44 | (CT4*f1)/(CT2 + CT3) [mm] | 24.39 |
| f3/R6 | -1.60 | f1/f2 | -0.56 | R1/f1 | 1.00 |
| f1/f | 5.79 | R5*R6/(f2*CT2) | 33.44 | (R1/R2)*CT1 [mm] | -3.12 |
| f2/CT2 | -70.74 | R7/CT4 | 64.98 | R6/R5 | -0.15 |
| (f3/CT3) + (f4/CT4) | 132.29 | CA4/(TDP3 + TDP6) | 3.22 | — | — |

Fourth Embodiment

Figure 4:
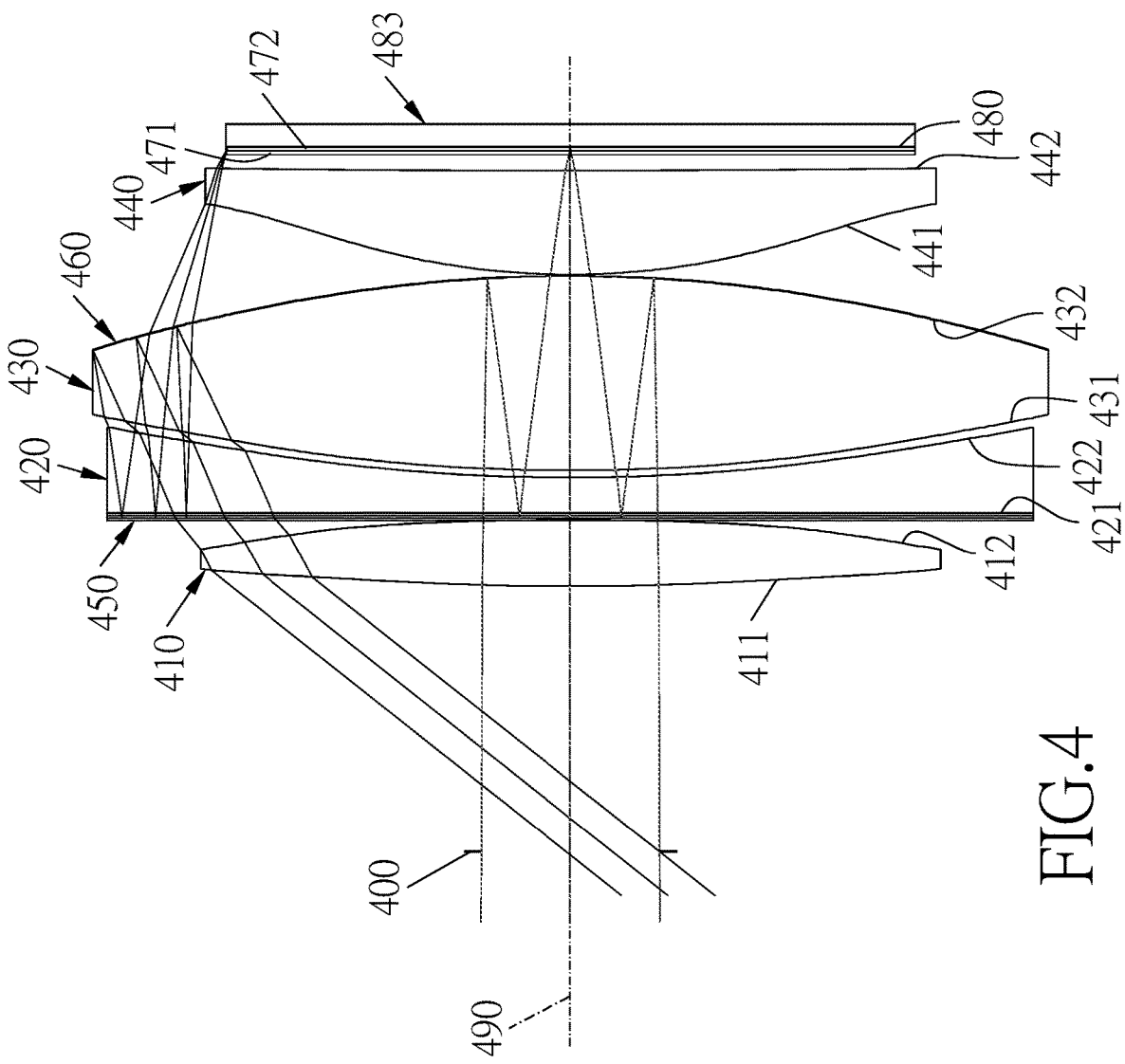
FIG. 4 is a schematic view of an optical lens assembly in accordance with a fourth embodiment of the present invention.

Referring to FIG. 4, an optical lens assembly in accordance with a fourth embodiment of the present invention includes, in order from a visual side to an image source side along an optical axis 490: a stop 400, a first lens 410, a first absorptive polarizer, a reflective polarizer, a first phase retarder, a second lens 420, a third lens 430, a partial-reflective-partial-transmissive element 460, a fourth lens 440, a second phase retarder 471, a second absorptive polarizer 472 and an image source plane 480. The optical lens assembly has, for example, but not limited to, a total of four lenses with refractive power. The first absorptive polarizer, the reflective polarizer and the first phase retarder form an optical element group 450.

The first lens 410 with positive refractive power includes a visual-side surface 411 and an image source-side 412, the visual-side surface 411 of the first lens 410 is convex in a paraxial region thereof, the image source-side surface 412 of the first lens 410 is convex in a paraxial region thereof, the visual-side surface 411 and the image source-side surface 412 of the first lens 410 are aspheric, and the first lens 410 is made of plastic.

The second lens 420 with negative refractive power includes a visual-side surface 421 and an image source-side surface 422, the visual-side surface 421 of the second lens 420 is flat in a paraxial region thereof, the image source-side surface 422 of the second lens 420 is concave in a paraxial region thereof, the image source-side surface 422 of the second lens 420 is aspheric, and the second lens 420 is made of plastic.

The third lens 430 with positive refractive power includes a visual-side surface 431 and an image source-side surface 432, the visual-side surface 431 of the third lens 430 is convex in a paraxial region thereof, the image source-side surface 432 of the third lens 430 is convex in a paraxial region thereof, the visual-side surface 431 and the image source-side surface 432 of the third lens 430 are aspheric, and the third lens 430 is made of plastic.

The fourth lens 440 with positive refractive power includes a visual-side surface 441 and an image source-side surface 442, the visual-side surface 441 of the fourth lens mentioned lenses in the first embodiment. The definitions of the surfaces in Table 13 can be referred to the relevant description of Table 1 and will not be explained again.

TABLE 13

Embodiment 4
f = 22.60 mm, EPD = 10.00 mm, FOV = 102.74°

| Surface | | Radius of curvature | Thickness/ gap | Refractive index (nd) | Abbe number (vd) | Refraction/ reflection |
|---|---|---|---|---|---|---|
| 0 | Stop | Infinity | 15.000 | — | — | — |
| 1 | First lens | 170.368 | 3.741 | 1.544 | 55.9 | Refraction |
| 2 | | −257.218 | 0.100 | — | — | Refraction |
| 3 | First absorptive polarizer | Infinity | 0.100 | 1.533 | 56.0 | Refraction |
| 4 | Reflective polarizer | Infinity | 0.100 | 1.533 | 56.0 | Refraction |
| 5 | First phase retarder | Infinity | 0.100 | 1.533 | 56.0 | Refraction |
| 6 | Second lens | Infinity | 2.000 | 1.645 | 23.4 | Refraction |
| 7 | | 113.800 | 0.400 | — | — | Refraction |
| 8 | Third lens | 112.516 | 10.960 | 1.544 | 55.9 | Refraction |
| 9 | Partial-reflective-partial-transmissive element | −81.858 | −10.960 | 1.544 | 55.9 | Reflection |
| 10 | | 112.516 | −0.400 | — | — | Refraction |
| 11 | Second lens | 113.800 | −2.000 | 1.645 | 23.4 | Refraction |
| 12 | First phase retarder | Infinity | −0.100 | 1.533 | 56.0 | Refraction |
| 13 | Reflective polarizer | Infinity | −0.100 | 1.533 | 56.0 | Refraction |
| 14 | | Infinity | 0.100 | 1.533 | 56.0 | Reflection |
| 15 | First phase retarder | Infinity | 0.100 | 1.533 | 56.0 | Refraction |
| 16 | Second lens | Infinity | 2.000 | 1.645 | 23.4 | Refraction |
| 17 | | 113.800 | 0.400 | — | — | Refraction |
| 18 | Third lens | 112.516 | 10.960 | 1.544 | 55.9 | Refraction |
| 19 | Partial-reflective-partial-transmissive element | −81.858 | 0.100 | — | — | Refraction |
| 20 | Fourth lens | 42.145 | 5.872 | 1.544 | 55.9 | Refraction |
| 21 | | 1508.493 | 1.131 | — | — | Refraction |
| 22 | Second phase retarder | Infinity | 0.100 | 1.533 | 56.0 | Refraction |
| 23 | Second absorptive polarizer | Infinity | 0.100 | 1.533 | 56.0 | Refraction |
| 24 | Image source | Infinity | — | — | — | — |

The reference wavelength is 555 nm.

440 is convex in a paraxial region thereof, the image source-side surface 442 of the fourth lens 440 is concave in a paraxial region thereof, the visual-side surface 441 of the fourth lens 440 is aspheric, the image source-side surface 442 of the fourth lens 440 is spherical, and the fourth lens 440 is made of plastic.

The optical lens assembly works in cooperation with an image source 483 disposed on the image source plane 480.

The configurations of the stop 400, the optical element group 450, the partial-reflective-partial-transmissive element 460, the second phase retarder 471 and the second absorptive polarizer 472 and the type of the image source 483 may refer to those of the stop 100, the optical element group 150, the partial-reflective-partial-transmissive element 160, the second phase retarder 171, the second absorptive polarizer 172 and the image source 183 of the first embodiment and will not be explained again.

Please refer to Tables 13-16, Table 13 shows the detailed optical data of the elements of the optical lens assembly of the fourth embodiment, Table 14 shows the data of the aspherical surfaces of the lenses of the optical lens assembly of the fourth embodiment, Table 15 shows the remaining parameters of the optical lens assembly of the fourth embodiment and the values thereof, and the values of the parameters in Tables 13 and 15 meet the formulas of Table 16. In the fourth embodiment, the equation of the aspheric surface profiles of the aforementioned lenses is the same as the equation of the aspheric surface profiles of the afore-

TABLE 14

Embodiment 4
Aspheric Coefficients

| Surface | 1 | 2 | 6, 12, 16 | 7, 11, 17 |
|---|---|---|---|---|
| K: | −9.0000E+01 | 6.3797E+01 | 0.0000E+00 | 1.1558E+01 |
| A2: | 0.0000E+00 | 0.0000E+00 | 0.0000E+00 | 0.0000E+00 |
| A4: | −7.5483E−07 | −6.2813E−06 | 0.0000E+00 | 5.6511E−07 |
| A6: | −6.0229E−10 | 3.4458E−09 | 0.0000E+00 | −3.5784E−09 |
| A8: | 1.5686E−12 | 1.2460E−12 | 0.0000E+00 | −1.9792E−12 |
| A10: | 3.7135E−15 | 4.3921E−15 | 0.0000E+00 | 5.6221E−16 |
| A12: | 3.4472E−18 | 6.3267E−18 | 0.0000E+00 | 2.2241E−18 |
| A14: | 2.3347E−21 | 1.6898E−20 | 0.0000E+00 | 1.1793E−21 |
| A16: | 0.0000E+00 | 0.0000E+00 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

| Surface | 8, 10, 18 | 9, 19 | 20 | 21 |
|---|---|---|---|---|
| K: | 1.1310E+01 | −2.2473E+00 | −1.0207E−01 | 0.0000E+00 |
| A2: | 0.0000E+00 | 0.0000E+00 | 0.0000E+00 | 0.0000E+00 |
| A4: | 8.5200E−07 | 1.8672E−07 | 2.1854E−06 | 0.0000E+00 |
| A6: | −3.5786E−09 | 1.9975E−10 | −1.5408E−08 | 0.0000E+00 |
| A8: | −1.9386E−12 | −6.1884E−14 | −2.8216E−11 | 0.0000E+00 |
| A10: | 6.0749E−16 | −2.1218E−16 | −4.0222E−15 | 0.0000E+00 |
| A12: | 2.0365E−18 | −1.2956E−19 | 4.7940E−17 | 0.0000E+00 |
| A14: | 3.6893E−22 | −6.9936E−24 | 6.0891E−20 | 0.0000E+00 |
| A16: | 0.0000E+00 | 0.0000E+00 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

TABLE 15

| | | | | Embodiment 4 | | | |
|---|---|---|---|---|---|---|---|
| f1 [mm] | 188.40 | CA1 [mm] | 20.15 | TDP6 [mm] | 4.16 | | |
| f2 [mm] | −176.67 | CA4 [mm] | 25.92 | IMH [mm] | 19.25 | 5 | |
| f3 [mm] | 88.60 | TDP1 [mm] | 0.89 | — | — | | |
| f4 [mm] | 79.34 | TDP3 [mm] | 0.00 | — | — | | |

TABLE 16

| | | | | Embodiment 4 | |
|---|---|---|---|---|---|
| CT3/TDP6 | 2.63 | f1/CT1 | 50.36 | R1/CT1 | 45.54 |
| CA1/TDP1 | 22.57 | (f2/CT1) + (f1/CT2) | 46.97 | (CT4*f1)/(CT2 + CT3) [mm] | 85.36 |
| f3/R6 | −1.08 | f1/f2 | −1.07 | R1/f1 | 0.90 |
| f1/f | 8.34 | R5*R6/(f2*CT2) | 26.07 | (R1/R2)*CT1 [mm] | −2.48 |
| f2/CT2 | −88.33 | R7/CT4 | 7.18 | R6/R5 | −0.73 |
| (f3/CT3) + (f4/CT4) | 21.60 | CA4/(TDP3 + TDP6) | 6.23 | — | — |

Fifth Embodiment

Figure 5:
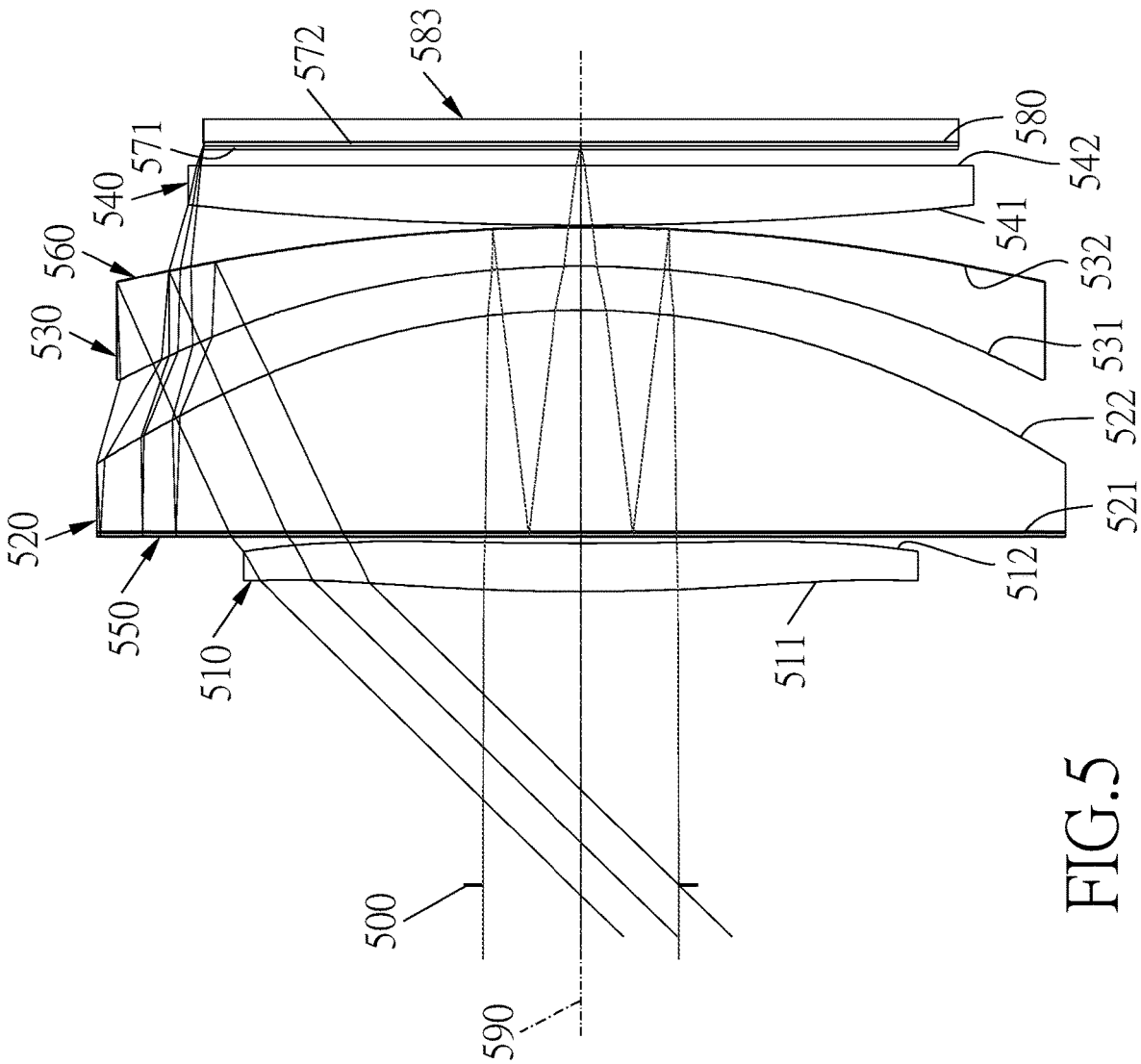
FIG. 5 is a schematic view of an optical lens assembly in accordance with a fifth embodiment of the present invention.

Referring to FIG. 5, an optical lens assembly in accordance with a fifth embodiment of the present invention includes, in order from a visual side to an image source side along an optical axis 590: a stop 500, a first lens 510, a first absorptive polarizer, a reflective polarizer, a first phase retarder, a second lens 520, a third lens 530, a partial-reflective-partial-transmissive element 560, a fourth lens 540, a second phase retarder 571, a second absorptive polarizer 572 and an image source plane 580. The optical lens assembly has, for example, but not limited to, a total of four lenses with refractive power. The first absorptive polarizer, the reflective polarizer and the first phase retarder form an optical element group 550.

The first lens 510 with positive refractive power includes a visual-side surface 511 and an image source-side 512, the visual-side surface 511 of the first lens 510 is convex in a paraxial region thereof, the image source-side surface 512 of the first lens 510 is concave in a paraxial region thereof, the visual-side surface 511 and the image source-side surface 512 of the first lens 510 are aspheric, and the first lens 510 is made of plastic.

The second lens 520 with positive refractive power includes a visual-side surface 521 and an image source-side surface 522, the visual-side surface 521 of the second lens 520 is flat in a paraxial region thereof, the image source-side surface 522 of the second lens 520 is convex in a paraxial region thereof, the image source-side surface 522 of the second lens 520 is aspheric, and the second lens 520 is made of plastic.

The third lens 530 with negative refractive power includes a visual-side surface 531 and an image source-side surface 532, the visual-side surface 531 of the third lens 530 is concave in a paraxial region thereof, the image source-side surface 532 of the third lens 530 is convex in a paraxial region thereof, the visual-side surface 531 and the image source-side surface 532 of the third lens 530 are aspheric, and the third lens 530 is made of plastic.

The fourth lens 540 with positive refractive power includes a visual-side surface 541 and an image source-side surface 542, the visual-side surface 541 of the fourth lens 540 is convex in a paraxial region thereof, the image source-side surface 542 of the fourth lens 540 is flat in a paraxial region thereof, the visual-side surface 541 of the fourth lens 540 is spherical, and the fourth lens 540 is made of plastic.

The optical lens assembly works in cooperation with an image source 583 disposed on the image source plane 580.

The configurations of the stop 500, the optical element group 550, the partial-reflective-partial-transmissive element 560, the second phase retarder 571 and the second absorptive polarizer 572 and the type of the image source 583 may refer to those of the stop 100, the optical element group 150, the partial-reflective-partial-transmissive element 160, the second phase retarder 171, the second absorptive polarizer 172 and the image source 183 of the first embodiment and will not be explained again.

Please refer to Tables 17-20, Table 17 shows the detailed optical data of the elements of the optical lens assembly of the fifth embodiment, Table 18 shows the data of the aspherical surfaces of the lenses of the optical lens assembly of the fifth embodiment, Table 19 shows the remaining parameters of the optical lens assembly of the fifth embodiment and the values thereof, and the values of the parameters in Tables 17 and 19 meet the formulas of Table 20. In the fifth embodiment, the equation of the aspheric surface profiles of the aforementioned lenses is the same as the equation of the aspheric surface profiles of the aforementioned lenses in the first embodiment. The definitions of the surfaces in Table 17 can be referred to the relevant description of Table 1 and will not be explained again.

TABLE 17

| | | Embodiment 5 f = 25.52 mm, EPD = 10.00 mm, FOV = 91.11° | | | | |
|---|---|---|---|---|---|---|
| Surface | | Radius of curvature | Thickness/ gap | Refractive index (nd) | Abbe number (vd) | Refraction/ reflection |
| 0 | Stop | Infinity | 15.000 | — | — | — |
| 1 | First lens | 105.750 | 2.500 | 1.544 | 55.9 | Refraction |
| 2 | | 274.239 | 0.300 | — | — | Refraction |

TABLE 17-continued

Embodiment 5
f = 25.52 mm, EPD = 10.00 mm, FOV = 91.11°

| Surface | | Radius of curvature | Thickness/ gap | Refractive index (nd) | Abbe number (vd) | Refraction/ reflection |
|---|---|---|---|---|---|---|
| 3 | First absorptive polarizer | Infinity | 0.100 | 1.533 | 56.0 | Refraction |
| 4 | Reflective polarizer | Infinity | 0.100 | 1.533 | 56.0 | Refraction |
| 5 | First phase retarder | Infinity | 0.100 | 1.533 | 56.0 | Refraction |
| 6 | Second lens | Infinity | 11.294 | 1.544 | 55.9 | Refraction |
| 7 | | −40.058 | 2.279 | — | — | Refraction |
| 8 | Third lens | −52.745 | 2.000 | 1.645 | 23.4 | Refraction |
| 9 | Partial-reflective-partial-transmissive element | −98.359 | −2.000 | 1.645 | 23.4 | Reflection |
| 10 | | −52.745 | −2.279 | — | — | Refraction |
| 11 | Second lens | −40.058 | −11.294 | 1.544 | 55.9 | Refraction |
| 12 | First phase retarder | Infinity | −0.100 | 1.533 | 56.0 | Refraction |
| 13 | Reflective polarizer | Infinity | −0.100 | 1.533 | 56.0 | Refraction |
| 14 | | Infinity | 0.100 | 1.533 | 56.0 | Reflection |
| 15 | First phase retarder | Infinity | 0.100 | 1.533 | 56.0 | Refraction |
| 16 | Second lens | Infinity | 11.294 | 1.544 | 55.9 | Refraction |
| 17 | | −40.058 | 2.279 | — | — | Refraction |
| 18 | Third lens | −52.745 | 2.000 | 1.645 | 23.4 | Refraction |
| 19 | Partial-reflective-partial-transmissive element | −98.359 | 0.100 | — | — | Refraction |
| 20 | Fourth lens | 196.923 | 3.027 | 1.544 | 55.9 | Refraction |
| 21 | | Infinity | 1.000 | — | — | Refraction |
| 22 | Second phase retarder | Infinity | 0.100 | 1.533 | 56.0 | Refraction |
| 23 | Second absorptive polarizer | Infinity | 0.100 | 1.533 | 56.0 | Refraction |
| 24 | Image source | Infinity | — | — | — | — |

The reference wavelength is 555 nm.

TABLE 18

Embodiment 5
Aspheric Coefficients

| Surface | 1 | 2 | 6, 12, 16 | 7, 11, 17 |
|---|---|---|---|---|
| K: | −9.0000E+01 | 9.0000E+01 | 0.0000E+00 | 5.8615E−01 |
| A2: | 0.0000E+00 | 0.0000E+00 | 0.0000E+00 | 0.0000E+00 |
| A4: | 7.4965E−08 | −1.0815E−05 | 0.0000E+00 | 1.8407E−06 |
| A6: | −1.6820E−08 | −2.3414E−09 | 0.0000E+00 | 2.4903E−09 |
| A8: | −9.4754E−12 | −1.2564E−12 | 0.0000E+00 | 9.1211E−13 |
| A10: | 2.3926E−14 | −9.5461E−15 | 0.0000E+00 | 1.1695E−16 |
| A12: | 1.9449E−17 | 3.9295E−18 | 0.0000E+00 | 1.9540E−18 |
| A14: | −1.2507E−19 | 1.2767E−19 | 0.0000E+00 | 4.4110E−21 |
| A16: | −2.9163E−22 | −8.5092E−23 | 0.0000E+00 | −4.8974E−24 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

| Surface | 8, 10, 18 | 9, 19 | 20 | 21 |
|---|---|---|---|---|
| K: | 1.0072E+00 | 8.7903E−02 | 0.0000E+00 | 0.0000E+00 |
| A2: | 0.0000E+00 | 0.0000E+00 | 0.0000E+00 | 0.0000E+00 |
| A4: | −5.4588E−07 | −2.0425E−08 | 0.0000E+00 | 0.0000E+00 |
| A6: | 2.3738E−11 | 2.4946E−10 | 0.0000E+00 | 0.0000E+00 |

TABLE 18-continued

Embodiment 5
Aspheric Coefficients

| | | | | |
|---|---|---|---|---|
| A8: | 1.5088E−12 | 8.0346E−13 | 0.0000E+00 | 0.0000E+00 |
| A10: | 2.1509E−15 | −1.8863E−16 | 0.0000E+00 | 0.0000E+00 |
| A12: | 5.4373E−20 | −1.6968E−18 | 0.0000E+00 | 0.0000E+00 |
| A14: | −2.9485E−21 | −1.7466E−21 | 0.0000E+00 | 0.0000E+00 |
| A16: | 4.6207E−24 | 3.9684E−24 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

TABLE 19

Embodiment 5

| | | | | | |
|---|---|---|---|---|---|
| f1 [mm] | 313.79 | CA1 [mm] | 17.32 | TDP6 [mm] | 2.88 |
| f2 [mm] | 73.41 | CA4 [mm] | 24.77 | IMH [mm] | 19.25 |
| f3 [mm] | −179.66 | TDP1 [mm] | 0.50 | — | — |
| f4 [mm] | 360.88 | TDP3 [mm] | 0.00 | — | — |

TABLE 20

Embodiment 5

| | | | | | |
|---|---|---|---|---|---|
| CT3/TDP6 | 0.69 | f1/CT1 | 125.51 | R1/CT1 | 42.30 |
| CA1/TDP1 | 34.65 | (f2/CT1) + (f1/CT2) | 57.15 | (CT4*f1)/(CT2 + CT3) [mm] | 71.45 |
| f3/R6 | 1.83 | f1/f2 | 4.27 | R1/f1 | 0.34 |
| f1/f | 12.30 | R5*R6/(f2*CT2) | 6.26 | (R1/R2)*CT1 [mm] | 0.96 |
| f2/CT2 | 6.50 | R7/CT4 | 65.06 | R6/R5 | 1.86 |
| (f3/CT3) + (f4/CT4) | 29.40 | CA4/(TDP3 + TDP6) | 8.59 | — | — |

Sixth Embodiment

Figure 6:
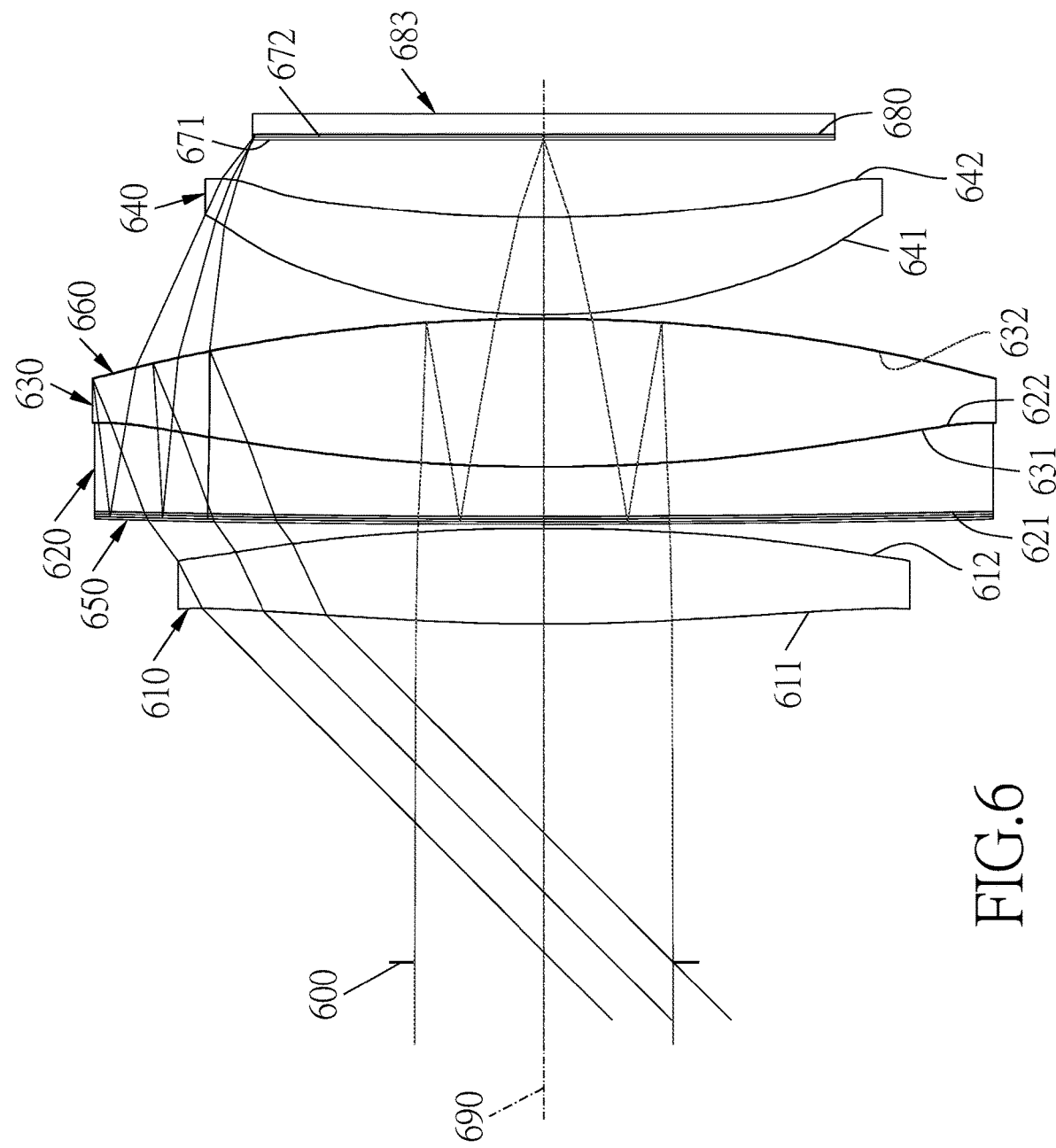
FIG. 6 is a schematic view of an optical lens assembly in accordance with a sixth embodiment of the present invention.

Referring to FIG. 6, an optical lens assembly in accordance with a sixth embodiment of the present invention includes, in order from a visual side to an image source side along an optical axis 690: a stop 600, a first lens 610, a first absorptive polarizer, a reflective polarizer, a first phase retarder, a second lens 620, a third lens 630, a partial-reflective-partial-transmissive element 660, a fourth lens 640, a second phase retarder 671, a second absorptive polarizer 672 and an image source plane 680. The optical lens assembly has, for example, but not limited to, a total of four lenses with refractive power. The first absorptive polarizer, the reflective polarizer and the first phase retarder form an optical element group 650.

The first lens 610 with positive refractive power includes a visual-side surface 611 and an image source-side 612, the visual-side surface 611 of the first lens 610 is convex in a paraxial region thereof, the image source-side surface 612 of the first lens 610 is convex in a paraxial region thereof, the visual-side surface 611 and the image source-side surface 612 of the first lens 610 are aspheric, and the first lens 610 is made of plastic.

The second lens 620 with negative refractive power includes a visual-side surface 621 and an image source-side surface 622, the visual-side surface 621 of the second lens 620 is convex in a paraxial region thereof, the image source-side surface 622 of the second lens 620 is concave in a paraxial region thereof, the visual-side surface 621 of the second lens 620 is spherical, the image source-side surface 622 of the second lens 620 is aspheric, and the second lens 620 is made of plastic.

The third lens 630 with positive refractive power includes a visual-side surface 631 and an image source-side surface 632, the visual-side surface 631 of the third lens 630 is convex in a paraxial region thereof, the image source-side surface 632 of the third lens 630 is convex in a paraxial region thereof, the visual-side surface 631 and the image source-side surface 632 of the third lens 630 are aspheric, and the third lens 630 is made of plastic. The second lens 620 and the third lens 630 together form a cemented doublet lens.

The fourth lens 640 with positive refractive power includes a visual-side surface 641 and an image source-side surface 642, the visual-side surface 641 of the fourth lens 640 is convex in a paraxial region thereof, the image source-side surface 642 of the fourth lens 640 is concave in a paraxial region thereof, the visual-side surface 641 and the image source-side surface 642 of the fourth lens 640 are aspheric, and the fourth lens 640 is made of plastic.

The optical lens assembly works in cooperation with an image source 683 disposed on the image source plane 680.

The configurations of the stop 600, the optical element group 650, the partial-reflective-partial-transmissive element 660, the second phase retarder 671 and the second absorptive polarizer 672 and the type of the image source 683 may refer to those of the stop 100, the optical element group 150, the partial-reflective-partial-transmissive element 160, the second phase retarder 171, the second absorptive polarizer 172 and the image source 183 of the first embodiment and will not be explained again.

Please refer to Tables 21-24, Table 21 shows the detailed optical data of the elements of the optical lens assembly of the sixth embodiment, Table 22 shows the data of the aspherical surfaces of the lenses of the optical lens assembly of the sixth embodiment, Table 23 shows the remaining parameters of the optical lens assembly of the sixth embodiment and the values thereof, and the values of the parameters in Tables 21 and 23 meet the formulas of Table 24. In the sixth embodiment, the equation of the aspheric surface profiles of the aforementioned lenses is the same as the equation of the aspheric surface profiles of the aforementioned lenses in the first embodiment. The definitions of the surfaces in Table 21 can be referred to the relevant description of Table 1 and will not be explained again.

TABLE 21

| Surface | | Radius of curvature | Thickness/ gap | Refractive index (nd) | Abbe number (vd) | Refraction/ reflection |
|---|---|---|---|---|---|---|
| 0 | Stop | Infinity | 13.000 | — | — | — |
| 1 | First lens | 85.053 | 3.674 | 1.544 | 55.9 | Refraction |
| 2 | | −81.596 | 0.150 | — | — | — |
| 3 | First absorptive polarizer | 763.061 | 0.100 | 1.533 | 56.0 | Refraction |
| 4 | Reflective polarizer | 763.061 | 0.100 | 1.533 | 56.0 | Refraction |
| 5 | First phase retarder | 763.061 | 0.100 | 1.533 | 56.0 | Refraction |
| 6 | Second lens | 763.061 | 1.936 | 1.645 | 23.4 | Refraction |
| 7 | Third lens | 90.000 | 5.680 | 1.544 | 55.9 | Refraction |
| 8 | Partial-reflective-partial-transmissive element | −69.768 | −5.680 | 1.544 | 55.9 | Reflection |
| 9 | Second lens | 90.000 | −1.936 | 1.645 | 23.4 | Refraction |
| 10 | First phase retarder | 763.061 | −0.100 | 1.533 | 56.0 | Refraction |
| 11 | Reflective polarizer | 763.061 | −0.100 | 1.533 | 56.0 | Refraction |
| 12 | | 763.061 | 0.100 | 1.533 | 56.0 | Reflection |
| 13 | First phase retarder | 763.061 | 0.100 | 1.533 | 56.0 | Refraction |
| 14 | Second lens | 763.061 | 1.936 | 1.645 | 23.4 | Refraction |
| 15 | Third lens | 90.000 | 5.680 | 1.544 | 55.9 | Refraction |
| 16 | Partial-reflective-partial-transmissive element | −69.768 | 0.150 | — | — | Refraction |
| 17 | Fourth lens | 24.800 | 3.753 | 1.544 | 55.9 | Refraction |
| 18 | | 63.444 | 2.983 | — | — | Refraction |
| 19 | Second phase retarder | Infinity | 0.100 | 1.533 | 56.0 | Refraction |

Embodiment 6
f = 15.59 mm, EPD = 10.00 mm, FOV = 90.22°

TABLE 21-continued

| | | Radius of curvature | Thickness/ gap | Refractive index (nd) | Abbe number (vd) | Refraction/ reflection |
|---|---|---|---|---|---|---|
| Surface | | | | | | |
| 20 | Second absorptive polarizer | Infinity | 0.100 | 1.533 | 56.0 | Refraction |
| 21 | Image source | Infinity | — | — | — | — |

Embodiment 6
f = 15.59 mm, EPD = 10.00 mm, FOV = 90.22°

The reference wavelength is 555 nm.

TABLE 22

Embodiment 6
Aspheric Coefficients

| Surface | 1 | 2 | 6, 10, 14 | 7, 9, 15 |
|---|---|---|---|---|
| K: | 0.0000E+00 | 0.0000E+00 | 0.0000E+00 | 0.0000E+00 |
| A2: | 0.0000E+00 | 0.0000E+00 | 0.0000E+00 | 0.0000E+00 |
| A4: | 1.2637E−05 | 4.5030E−05 | 0.0000E+00 | 7.4944E−05 |
| A6: | −1.2506E−06 | −1.8240E−06 | 0.0000E+00 | −1.5778E−06 |
| A8: | 2.5432E−08 | 3.2740E−08 | 0.0000E+00 | 1.8336E−08 |
| A10: | −2.8312E−10 | −3.2986E−10 | 0.0000E+00 | −1.2721E−10 |
| A12: | 1.7678E−12 | 1.8706E−12 | 0.0000E+00 | 5.1267E−13 |
| A14: | −5.7375E−15 | −5.4857E−15 | 0.0000E+00 | −1.0972E−15 |
| A16: | 7.4569E−18 | 6.4258E−18 | 0.0000E+00 | 9.5531E−19 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

| Surface | 8, 16 | 17 | 18 | — |
|---|---|---|---|---|
| K: | 0.0000E+00 | 0.0000E+00 | 0.0000E+00 | — |
| A2: | 0.0000E+00 | 0.0000E+00 | 0.0000E+00 | — |
| A4: | −7.3632E−06 | −1.1657E−05 | −4.6499E−06 | — |
| A6: | 1.4812E−07 | 7.1545E−07 | 2.6076E−06 | — |
| A8: | −1.7746E−09 | −1.0552E−08 | −7.2869E−08 | — |
| A10: | 1.2477E−11 | −8.8244E−11 | 5.1780E−10 | — |
| A12: | −4.9787E−14 | 2.4961E−12 | 2.2668E−12 | — |
| A14: | 1.0301E−16 | −1.5043E−14 | −3.6588E−14 | — |
| A16: | −8.5304E−20 | 2.8284E−17 | 1.0084E−16 | — |
| A18: | 0.0000E+00 | 0.0000E+00 | 0.0000E+00 | — |
| A20: | 0.0000E+00 | 0.0000E+00 | 0.0000E+00 | — |

TABLE 23

Embodiment 6

| f1 [mm] | 76.76 | CA1 [mm] | 14.10 | TDP6 [mm] | 2.29 |
|---|---|---|---|---|---|
| f2 [mm] | −158.37 | CA4 [mm] | 17.33 | IMH [mm] | 11.20 |
| f3 [mm] | 72.79 | TDP1 [mm] | 0.57 | — | — |
| f4 [mm] | 71.99 | TDP3 [mm] | 0.19 | — | — |

TABLE 24

Embodiment 6

| CT3/TDP6 | 2.48 | f1/CT1 | 20.89 | R1/CT1 | 23.15 |
|---|---|---|---|---|---|
| CA1/TDP1 | 24.59 | (f2/CT1) + (f1/CT2) | −3.45 | (CT4*f1)/(CT2 + CT3) [mm] | 37.83 |
| f3/R6 | −1.04 | f1/f2 | −0.48 | R1/f1 | 1.11 |
| f1/f | 4.92 | R5*R6/(f2*CT2) | 20.48 | (R1/R2)*CT1 [mm] | −3.83 |
| f2/CT2 | −81.82 | R7/CT4 | 6.61 | R6/R5 | −0.78 |
| (f3/CT3) + (f4/CT4) | 31.99 | CA4/(TDP3 + TDP6) | 7.01 | — | — |

Seventh Embodiment

Figure 7:
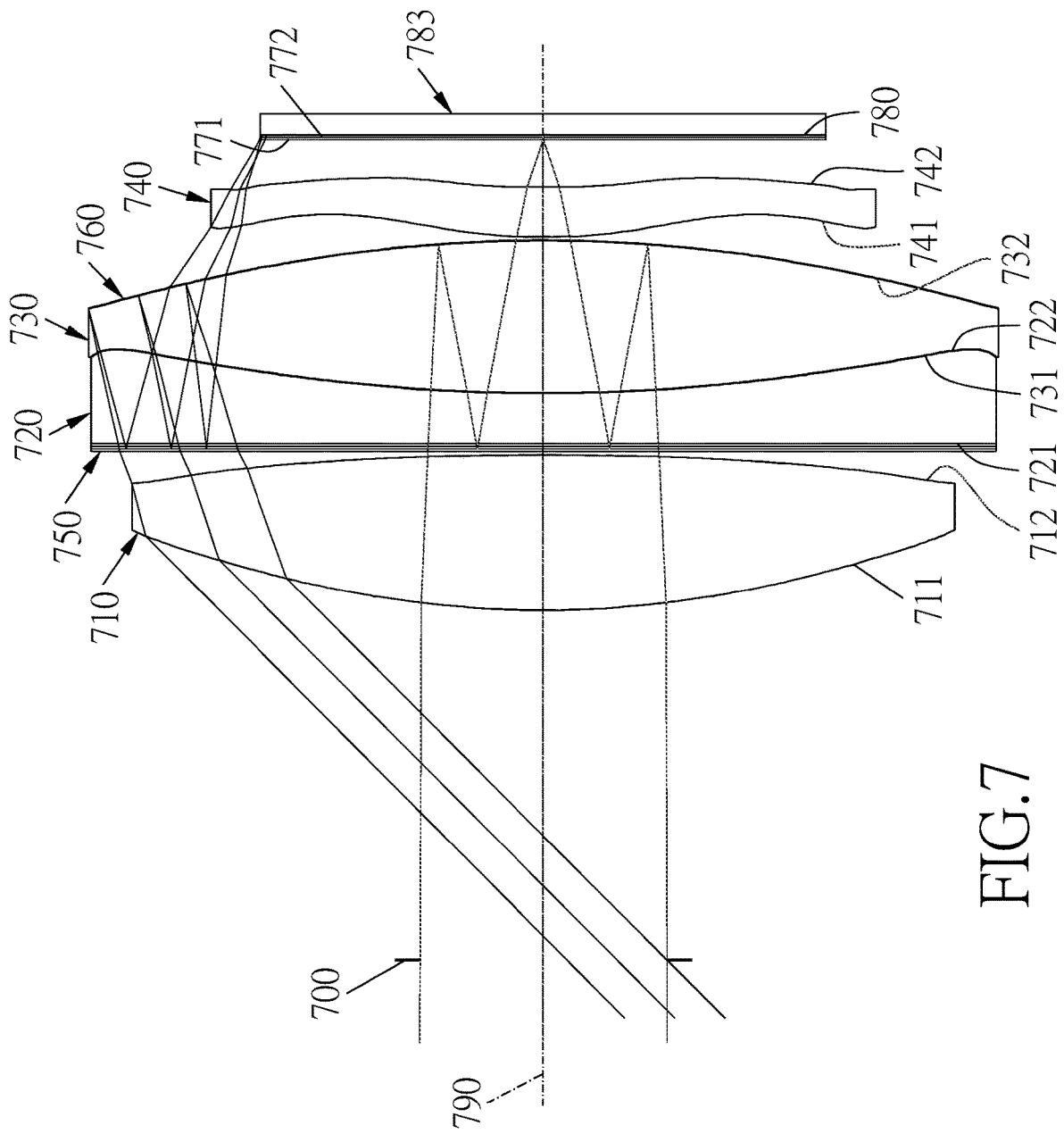
FIG. 7 is a schematic view of an optical lens assembly in accordance with a seventh embodiment of the present invention.

Referring to FIG. 7, an optical lens assembly in accordance with a seventh embodiment of the present invention includes, in order from a visual side to an image source side along an optical axis 790: a stop 700, a first lens 710, a first absorptive polarizer, a reflective polarizer, a first phase retarder, a second lens 720, a third lens 730, a partial-reflective-partial-transmissive element 760, a fourth lens 740, a second phase retarder 771, a second absorptive polarizer 772 and an image source plane 780. The optical lens assembly has, for example, but not limited to, a total of four lenses with refractive power. The first absorptive polarizer, the reflective polarizer and the first phase retarder form an optical element group 750.

The first lens 710 with positive refractive power includes a visual-side surface 711 and an image source-side 712, the visual-side surface 711 of the first lens 710 is convex in a paraxial region thereof, the image source-side surface 712 of the first lens 710 is convex in a paraxial region thereof, the visual-side surface 711 and the image source-side surface 712 of the first lens 710 are aspheric, and the first lens 710 is made of plastic.

The second lens 720 with negative refractive power includes a visual-side surface 721 and an image source-side surface 722, the visual-side surface 721 of the second lens 720 is flat in a paraxial region thereof, the image source-side surface 722 of the second lens 720 is concave in a paraxial region thereof, the image source-side surface 722 of the second lens 720 is aspheric, and the second lens 720 is made of plastic.

The third lens 730 with positive refractive power includes a visual-side surface 731 and an image source-side surface 732, the visual-side surface 731 of the third lens 730 is convex in a paraxial region thereof, the image source-side surface 732 of the third lens 730 is convex in a paraxial region thereof, the visual-side surface 731 and the image source-side surface 732 of the third lens 730 are aspheric, and the third lens 730 is made of plastic. The second lens 720 and the third lens 730 together form a cemented doublet lens.

The fourth lens 740 with positive refractive power includes a visual-side surface 741 and an image source-side surface 742, the visual-side surface 741 of the fourth lens 740 is convex in a paraxial region thereof, the image source-side surface 742 of the fourth lens 740 is concave in a paraxial region thereof, the visual-side surface 741 and the image source-side surface 742 of the fourth lens 740 are aspheric, and the fourth lens 740 is made of plastic.

The optical lens assembly works in cooperation with an image source 783 disposed on the image source plane 780.

The configurations of the stop 700, the optical element group 750, the partial-reflective-partial-transmissive element 760, the second phase retarder 771 and the second absorptive polarizer 772 and the type of the image source 783 may refer to those of the stop 100, the optical element group 150, the partial-reflective-partial-transmissive element 160, the second phase retarder 171, the second absorptive polarizer 172 and the image source 183 of the first embodiment and will not be explained again.

Please refer to Tables 25-28, Table 25 shows the detailed optical data of the elements of the optical lens assembly of the seventh embodiment, Table 26 shows the data of the aspherical surfaces of the lenses of the optical lens assembly of the seventh embodiment, Table 27 shows the remaining parameters of the optical lens assembly of the seventh embodiment and the values thereof, and the values of the parameters in Tables 25 and 27 meet the formulas of Table 28. In the seventh embodiment, the equation of the aspheric surface profiles of the aforementioned lenses is the same as the equation of the aspheric surface profiles of the aforementioned lenses in the first embodiment. The definitions of the surfaces in Table 25 can be referred to the relevant description of Table 1 and will not be explained again.

TABLE 26

Embodiment 7
Aspheric Coefficients

| Surface | 1 | 2 | 6, 14 | 7, 9, 15 |
|---|---|---|---|---|
| K: | −1.0565E+00 | 8.2285E+01 | 0.0000E+00 | 0.0000E+00 |
| A2: | 0.0000E+00 | 0.0000E+00 | 0.0000E+00 | 0.0000E+00 |
| A4: | −6.8196E−06 | −5.4679E−06 | 0.0000E+00 | 4.3743E−05 |
| A6: | 3.9386E−08 | 4.4176E−08 | 0.0000E+00 | −8.1723E−07 |
| A8: | 2.7024E−10 | 6.5495E−10 | 0.0000E+00 | 7.7119E−09 |
| A10: | −5.8618E−12 | −1.3280E−11 | 0.0000E+00 | −3.9657E−11 |
| A12: | 3.2697E−14 | 8.5543E−14 | 0.0000E+00 | 1.0440E−13 |
| A14: | −8.1186E−17 | −2.4737E−16 | 0.0000E+00 | −1.0990E−16 |
| A16: | 8.2972E−20 | 2.7933E−19 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

| Surface | 8, 16 | 17 | 18 | — |
|---|---|---|---|---|
| K: | 0.0000E+00 | −5.0485E−01 | −1.3337E+01 | — |
| A2 | 0.0000E+00 | 0.0000E+00 | 0.0000E+00 | — |
| A4 | −1.1596E−07 | 4.6539E−04 | 1.3727E−03 | — |
| A6: | 1.8570E−08 | −1.9091E−05 | −7.1067E−05 | — |
| A8: | −2.0570E−10 | 2.9285E−07 | 1.6234E−06 | — |
| A10: | 1.4426E−12 | −2.5557E−09 | −2.0572E−08 | — |
| A12: | −4.8623E−15 | 1.3161E−11 | 1.4855E−10 | — |
| A14: | 6.5427E−18 | −3.7491E−14 | −5.7052E−13 | — |
| A16: | −1.4640E−21 | 4.6284E−17 | 9.0258E−16 | — |
| A18: | 0.0000E+00 | 0.0000E+00 | 0.0000E+00 | — |
| A20: | 0.0000E+00 | 0.0000E+00 | 0.0000E+00 | — |

TABLE 25

Embodiment 7
f = 15.60 mm, EPD = 10.00 mm, FOV = 90.33°

| Surface | | Radius of curvature | Thickness/ gap | Refractive index (nd) | Abbe number (vd) | Refraction/ reflection |
|---|---|---|---|---|---|---|
| 0 | Stop | Infinity | 14.000 | — | — | — |
| 1 | First lens | 40.911 | 6.210 | 1.544 | 55.9 | Refraction |
| 2 | | −164.169 | 0.150 | — | — | — |
| 3 | First absorptive polarizer | Infinity | 0.100 | 1.533 | 56.0 | Refraction |
| 4 | Reflective polarizer | Infinity | 0.100 | 1.533 | 56.0 | Refraction |
| 5 | First phase retarder | Infinity | 0.100 | 1.533 | 56.0 | Refraction |
| 6 | Second lens | Infinity | 2.026 | 1.645 | 23.4 | Refraction |
| 7 | Third lens | 88.797 | 6.106 | 1.544 | 55.9 | Refraction |
| 8 | Partial-reflective- partial-transmissive element | −59.930 | −6.106 | 1.544 | 55.9 | Reflection |
| 9 | Second lens | 88.797 | −2.026 | 1.645 | 23.4 | Refraction |
| 10 | First phase retarder | Infinity | −0.100 | 1.533 | 56.0 | Refraction |
| 11 | Reflective polarizer | Infinity | −0.100 | 1.533 | 56.0 | Refraction |
| 12 | | Infinity | 0.100 | 1.533 | 56.0 | Reflection |
| 13 | First phase retarder | Infinity | 0.100 | 1.533 | 56.0 | Refraction |
| 14 | Second lens | Infinity | 2.026 | 1.645 | 23.4 | Refraction |
| 15 | Third lens | 88.797 | 6.106 | 1.544 | 55.9 | Refraction |
| 16 | Partial-reflective- partial-transmissive element | −59.930 | 0.150 | — | — | Refraction |
| 17 | Fourth lens | 30.595 | 1.985 | 1.544 | 55.9 | Refraction |
| 18 | | 127.696 | 1.883 | — | — | Refraction |
| 19 | Second phase retarder | Infinity | 0.100 | 1.533 | 56.0 | Refraction |
| 20 | Second absorptive polarizer | Infinity | 0.100 | 1.533 | 56.0 | Refraction |
| 21 | Image source | Infinity | — | — | — | — |

The reference wavelength is 555 nm.

TABLE 27

| | | Embodiment 7 | | | |
|---|---|---|---|---|---|
| f1 [mm] | 60.54 | CA1 [mm] | 15.81 | TDP6 [mm] | 2.46 |
| f2 [mm] | −137.67 | CA4 [mm] | 17.40 | IMH [mm] | 11.20 |
| f3 [mm] | 66.40 | TDP1 [mm] | 2.86 | — | — |
| f4 [mm] | 73.05 | TDP3 [mm] | 0.00 | — | — |

TABLE 28

| | | Embodiment 7 | | | |
|---|---|---|---|---|---|
| CT3/TDP6 | 2.48 | f1/CT1 | 9.75 | R1/CT1 | 6.59 |
| CA1/TDP1 | 5.52 | (f2/CT1) + (f1/CT2) | 7.71 | (CT4*f1)/(CT2 + CT3) [mm] | 14.78 |
| f3/R6 | −1.11 | f1/f2 | −0.44 | R1/f1 | 0.68 |
| f1/f | 3.88 | R5*R6/(f2*CT2) | 19.08 | (R1/R2)*CT1 [mm] | −1.55 |
| f2/CT2 | −67.95 | R7/CT4 | 15.41 | R6/R5 | −0.67 |
| (f3/CT3) + (f4/CT4) | 47.67 | CA4/(TDP3 + TDP6) | 7.08 | — | — |

Eighth Embodiment

Figure 8:
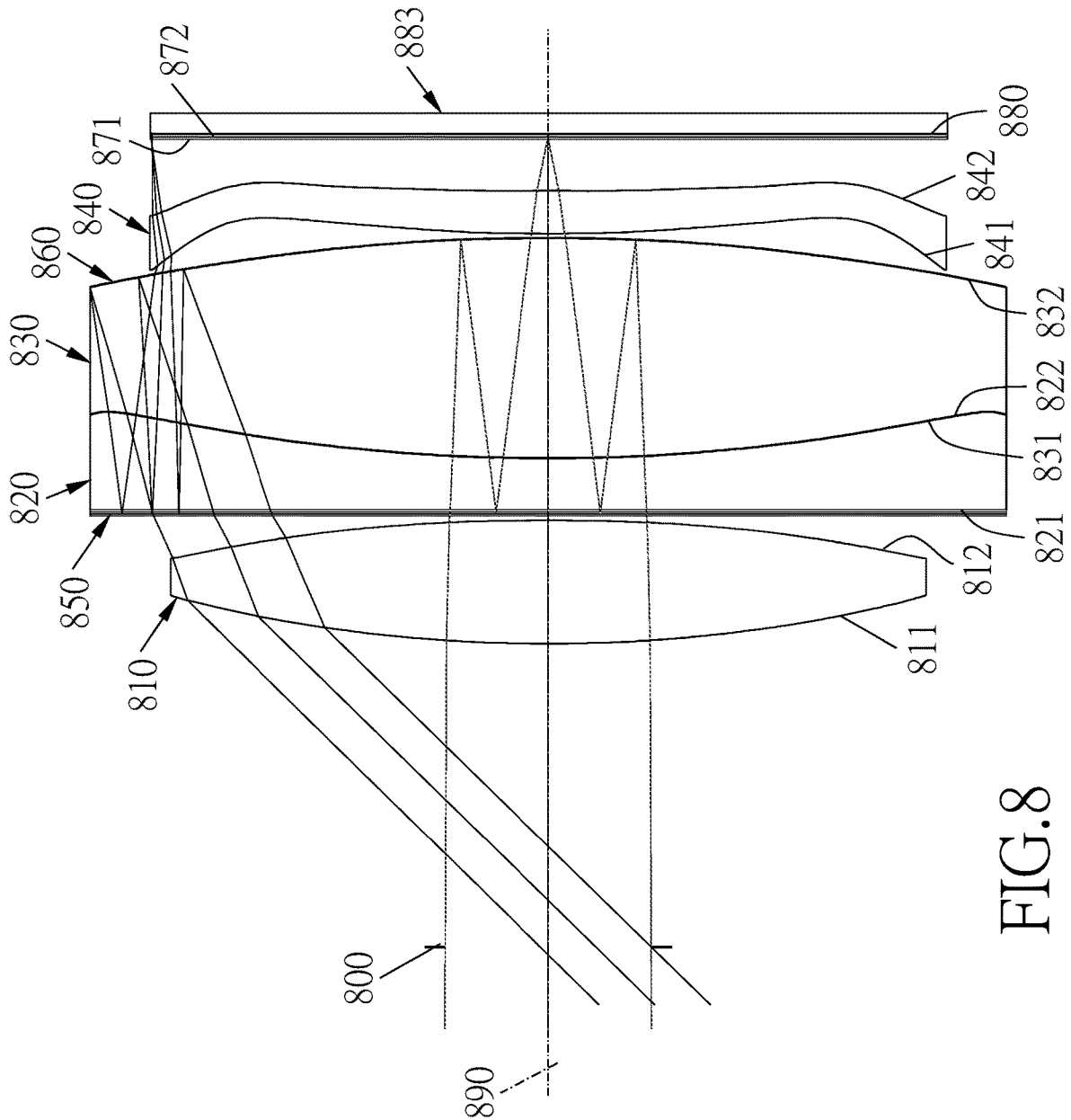
FIG. 8 is a schematic view of an optical lens assembly in accordance with an eighth embodiment of the present invention.

Referring to FIG. 8, an optical lens assembly in accordance with an eighth embodiment of the present invention includes, in order from a visual side to an image source side along an optical axis 890: a stop 800, a first lens 810, a first absorptive polarizer, a reflective polarizer, a first phase retarder, a second lens 820, a third lens 830, a partial-reflective-partial-transmissive element 860, a fourth lens 840, a second phase retarder 871, a second absorptive polarizer 872 and an image source plane 880. The optical lens assembly has, for example, but not limited to, a total of four lenses with refractive power. The first absorptive polarizer, the reflective polarizer and the first phase retarder form an optical element group 850.

The first lens 810 with positive refractive power includes a visual-side surface 811 and an image source-side 812, the visual-side surface 811 of the first lens 810 is convex in a paraxial region thereof, the image source-side surface 812 of the first lens 810 is convex in a paraxial region thereof, the visual-side surface 811 and the image source-side surface 812 of the first lens 810 are aspheric, and the first lens 810 is made of plastic.

The second lens 820 with negative refractive power includes a visual-side surface 821 and an image source-side surface 822, the visual-side surface 821 of the second lens 820 is flat in a paraxial region thereof, the image source-side surface 822 of the second lens 820 is concave in a paraxial region thereof, the image source-side surface 822 of the second lens 820 is aspheric, and the second lens 820 is made of plastic.

The third lens 830 with positive refractive power includes a visual-side surface 831 and an image source-side surface 832, the visual-side surface 831 of the third lens 830 is convex in a paraxial region thereof, the image source-side surface 832 of the third lens 830 is convex in a paraxial region thereof, the visual-side surface 831 and the image source-side surface 832 of the third lens 830 are aspheric, and the third lens 830 is made of plastic. The second lens 820 and the third lens 830 together form a cemented doublet lens.

The fourth lens 840 with positive refractive power includes a visual-side surface 841 and an image source-side surface 842, the visual-side surface 841 of the fourth lens 840 is convex in a paraxial region thereof, the image source-side surface 842 of the fourth lens 840 is convex in a paraxial region thereof, the visual-side surface 841 and the image source-side surface 842 of the fourth lens 840 are aspheric, and the fourth lens 840 is made of plastic.

The optical lens assembly works in cooperation with an image source 883 disposed on the image source plane 880.

The configurations of the stop 800, the optical element group 850, the partial-reflective-partial-transmissive element 860, the second phase retarder 871 and the second absorptive polarizer 872 and the type of the image source 883 may refer to those of the stop 100, the optical element group 150, the partial-reflective-partial-transmissive element 160, the second phase retarder 171, the second absorptive polarizer 172 and the image source 183 of the first embodiment and will not be explained again.

Please refer to Tables 29-32, Table 29 shows the detailed optical data of the elements of the optical lens assembly of the eighth embodiment, Table 30 shows the data of the aspherical surfaces of the lenses of the optical lens assembly of the eighth embodiment, Table 31 shows the remaining parameters of the optical lens assembly of the eighth embodiment and the values thereof, and the values of the parameters in Tables 29 and 31 meet the formulas of Table 32. In the eighth embodiment, the equation of the aspheric surface profiles of the aforementioned lenses is the same as the equation of the aspheric surface profiles of the aforementioned lenses in the first embodiment. The definitions of the surfaces in Table 29 can be referred to the relevant description of Table 1 and will not be explained again.

TABLE 29

| | | | | Embodiment 8 | | |
|---|---|---|---|---|---|---|
| | | f = 24.69 mm, EPD = 10.00 mm, FOV = 90.04° | | | | |
| Surface | | Radius of curvature | Thickness/ gap | Refractive index (nd) | Abbe number (vd) | Refraction/ reflection |
| 0 | Stop | Infinity | 15.000 | — | — | — |
| 1 | First lens | 77.254 | 6.125 | 1.544 | 55.9 | Refraction |

TABLE 29-continued

Embodiment 8
f = 24.69 mm, EPD = 10.00 mm, FOV = 90.04°

| Surface | | Radius of curvature | Thickness/ gap | Refractive index (nd) | Abbe number (vd) | Refraction/ reflection |
|---|---|---|---|---|---|---|
| 2 | | −99.739 | 0.200 | — | — | — |
| 3 | First absorptive polarizer | Infinity | 0.100 | 1.533 | 56.0 | Refraction |
| 4 | Reflective polarizer | Infinity | 0.100 | 1.533 | 56.0 | Refraction |
| 5 | First phase retarder | Infinity | 0.100 | 1.533 | 56.0 | Refraction |
| 6 | Second lens | Infinity | 2.551 | 1.645 | 23.4 | Refraction |
| 7 | Third lens | 108.364 | 10.911 | 1.544 | 55.9 | Refraction |
| 8 | Partial-reflective-partial-transmissive element | −96.700 | −10.911 | 1.544 | 55.9 | Reflection |
| 9 | Second lens | 108.364 | −2.551 | 1.645 | 23.4 | Refraction |
| 10 | First phase retarder | Infinity | −0.100 | 1.533 | 56.0 | Refraction |
| 11 | Reflective polarizer | Infinity | −0.100 | 1.533 | 56.0 | Refraction |
| 12 | | Infinity | 0.100 | 1.533 | 56.0 | Reflection |
| 13 | First phase retarder | Infinity | 0.100 | 1.533 | 56.0 | Refraction |
| 14 | Second lens | Infinity | 2.551 | 1.645 | 23.4 | Refraction |
| 15 | Third lens | 108.364 | 10.911 | 1.544 | 55.9 | Refraction |
| 16 | Partial-reflective-partial-transmissive element | −96.700 | 0.200 | — | — | Refraction |
| 17 | Fourth lens | 122.109 | 2.117 | 1.544 | 55.9 | Refraction |
| 18 | | −217.671 | 2.583 | — | — | Refraction |
| 19 | Second phase retarder | Infinity | 0.100 | 1.533 | 56.0 | Refraction |
| 20 | Second absorptive polarizer | Infinity | 0.100 | 1.533 | 56.0 | Refraction |
| 21 | Image source | Infinity | — | — | — | — |

The reference wavelength is 555 nm.

TABLE 30

Embodiment 8
Aspheric Coefficients

| Surface | 1 | 2 | 6, 14 | 7, 9, 15 |
|---|---|---|---|---|
| K: | 0.0000E+00 | 0.0000E+00 | 0.0000E+00 | 0.0000E+00 |
| A2: | 0.0000E+00 | 0.0000E+00 | 0.0000E+00 | 0.0000E+00 |
| A4: | 3.7692E−06 | 3.0929E−06 | 0.0000E+00 | 2.1258E−05 |
| A6: | −3.9446E−08 | −1.2331E−07 | 0.0000E+00 | −2.1868E−07 |
| A8: | 3.7433E−10 | 1.2588E−09 | 0.0000E+00 | 1.0815E−09 |
| A10: | −2.0841E−12 | −7.6327E−12 | 0.0000E+00 | −2.3068E−12 |
| A12: | 6.9281E−15 | 2.8310E−14 | 0.0000E+00 | 3.7343E−15 |
| A14: | −1.4082E−17 | −5.8512E−17 | 0.0000E+00 | 7.3093E−18 |
| A16: | 1.3878E−20 | 5.1190E−20 | 0.0000E+00 | −7.9129E−21 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

| Surface | 8, 16 | 17 | 18 | — |
|---|---|---|---|---|
| K: | 0.0000E+00 | 0.0000E+00 | 0.0000E+00 | — |
| A2: | 0.0000E+00 | 0.0000E+00 | 0.0000E+00 | — |
| A4: | −4.5728E−07 | 1.0372E−04 | 2.5920E−04 | — |
| A6: | 1.0614E−08 | −2.3961E−06 | −5.8231E−06 | — |

TABLE 30-continued

Embodiment 8
Aspheric Coefficients

| | | | | |
|---|---|---|---|---|
| A8: | −3.6789E−11 | 2.4082E−08 | 6.3395E−08 | — |
| A10: | 4.2677E−14 | −1.2331E−10 | −3.6341E−10 | — |
| A12: | 6.5074E−17 | 3.2267E−13 | 1.1201E−12 | — |
| A14: | −2.2890E−19 | −4.1239E−16 | −1.7694E−15 | — |
| A16: | 1.7470E−22 | 2.0271E−19 | 1.1296E−18 | — |
| A18: | 0.0000E+00 | 0.0000E+00 | 0.0000E+00 | — |
| A20: | 0.0000E+00 | 0.0000E+00 | 0.0000E+00 | — |

TABLE 31

Embodiment 8

| | | | | | |
|---|---|---|---|---|---|
| f1 [mm] | 80.60 | CA1 [mm] | 18.33 | TDP6 [mm] | 2.43 |
| f2 [mm] | −168.01 | CA4 [mm] | 21.34 | IMH [mm] | 19.25 |
| f3 [mm] | 95.24 | TDP1 [mm] | 2.40 | — | — |
| f4 [mm] | 143.37 | TDP3 [mm] | 0.00 | — | — |

TABLE 32

Embodiment 8

| | | | | | |
|---|---|---|---|---|---|
| CT3/TDP6 | 4.49 | f1/CT1 | 13.16 | R1/CT1 | 12.61 |
| CA1/TDP1 | 7.65 | (f2/CT1) + (f1/CT2) | 4.17 | (CT4*f1)/(CT2 + CT3) [mm] | 12.68 |
| f3/R6 | −0.98 | f1/f2 | −0.48 | R1/f1 | 0.96 |
| f1/f | 3.27 | R5*R6/(f2*CT2) | 24.45 | (R1/R2)*CT1 [mm] | −4.74 |
| f2/CT2 | −65.87 | R7/CT4 | 57.68 | R6/R5 | −0.89 |
| (f3/CT3) + (f4/CT4) | 76.45 | CA4/(TDP3 + TDP6) | 8.79 | — | — |

33

For the optical lens assembly in the present invention, the lenses can be made of plastic or glass. If the lens is made of plastic, it is conducive to reducing the manufacturing cost. If the lens is made of glass, it is conducive to enhancing the degree of freedom in the arrangement of refractive power of the optical lens assembly.

For the optical lens assembly in the present invention, the aspheric surface can have any profile shape other than the profile shape of a spherical surface, so more variables can be used in the design of aspheric surfaces (than spherical surfaces), which is conducive to reducing the optical aberration and the number of lenses, as well as the total length of the optical lens assembly.

For the optical lens assembly in the present invention, if the surface shape of a respective lens surface of a respective lens with refractive power is convex and the location of the convex portion of the respective lens surface of the respective lens is not defined, the convex portion is typically located in a paraxial region of the respective lens surface of the respective lens. If the surface shape of a respective lens surface of a respective lens is concave and the location of the concave portion of the respective lens surface of the respective lens is not defined, the concave portion is typically located in a paraxial region of the respective lens surface of the respective lens.

For the optical lens assembly in the present invention, the maximum effective radius of the lens surface is usually a radius of the effective optical region of the lens surface (i.e., a region which is not subjected to any surface treatment or extinction processing or is not provided with any shade).

Figure 9:
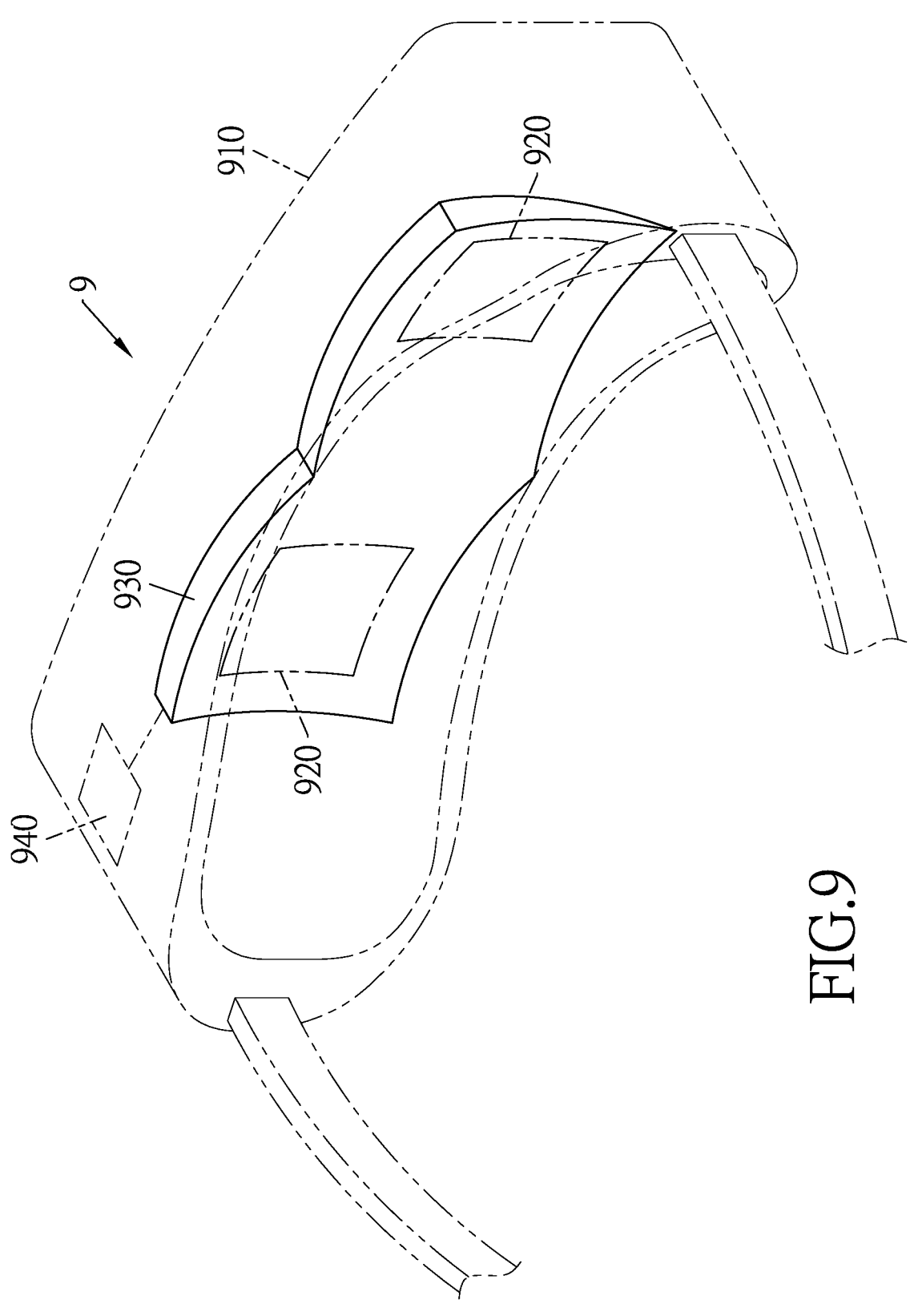
FIG. 9 is a schematic view of a head-mounted electronic device in accordance with an embodiment of the present invention.

The optical lens assembly of the present invention can be used in an electronic device, for example, but not limited to a head-mounted electronic device. FIG. 9 shows a head-mounted electronic device in accordance with an embodiment of the present invention. The head-mounted electronic device 9 is a head-mounted display device using, but is not limited to, the virtual reality technology, augmented reality technology or mixed reality technology and includes a housing 910, an optical module 920 disposed in the housing 910, an image source 930 and a controller 940.

The optical module 920 corresponds to the left and right eyes of the user. The optical module 920 includes an optical lens assembly described in any one of the first to eighth embodiments.

The image source 930 can be an image source described in any one of the first to eighth embodiments. The image source 930 corresponds to the left and right eyes of the user, and the type of the image source 930 may be an OLED display, a LED display, a liquid crystal display, or other display, but is not limited thereto.

The controller 940 is electrically connected to the image source 930, so as to control the image source 930 to display an image, whereby the head-mounted electronic device 9 can project the image to the eyes of the user.

What is claimed is:

1. An optical lens assembly comprising:
a reflective polarizer;
a phase retarder; and
in order from a visual side to an image source side, a first lens with positive refractive power; a second lens with refractive power; a third lens with refractive power, including a visual-side surface and an image source-side surface; a partial-reflective-partial-transmissive element; and a fourth lens with refractive power;
wherein the optical lens assembly has a total of four lenses with refractive power, the image source-side surface of the third lens is convex in a paraxial region thereof, the reflective polarizer is disposed between the first lens and the second lens, the phase retarder is disposed between the reflective polarizer and the partial-reflective-partial-transmissive element, a thickness of the third lens along an optical axis is CT3, an absolute value of a displacement in parallel to the optical axis from an intersection between the image source-side surface of the third lens and the optical axis to a maximum effective radius position on the image source-side surface of the third lens is TDP6, and the following condition is satisfied: $0.37 < CT3/TDP6 < 5.39$.

2. The optical lens assembly as claimed in claim 1, wherein a maximum effective radius of a visual-side surface of the first lens is CA1, an absolute value of a displacement in parallel to the optical axis from an intersection between the visual-side surface of the first lens and the optical axis to a maximum effective radius position on the visual-side surface of the first lens is TDP1, and the following condition is satisfied:

$$4.42 < CA1/TDP1 < 41.58.$$

3. The optical lens assembly as claimed in claim 1, wherein a focal length of the third lens is f3, a radius of curvature of the image source-side surface of the third lens is R6, and the following condition is satisfied: $-1.92 < f3/R6 < 8.96$.

4. The optical lens assembly as claimed in claim 1, wherein a focal length of the first lens is f1, a focal length of the optical lens assembly is f, and the following condition is satisfied: $2.61 < f1/f < 25.10$.

5. The optical lens assembly as claimed in claim 1, wherein a focal length of the second lens is f2, a thickness of the second lens along the optical axis is CT2, and the following condition is satisfied: $-106.00 < f2/CT2 < 19.81$.

6. The optical lens assembly as claimed in claim 1, wherein a focal length of the third lens is f3, a focal length of the fourth lens is f4, a thickness of the fourth lens along the optical axis is CT4, and the following condition is satisfied:

$$-120.81 < (f3/CT3) + (f4/CT4) < 158.75.$$

7. The optical lens assembly as claimed in claim 1, wherein a focal length of the first lens is f1, a thickness of the first lens along the optical axis is CT1, and the following condition is satisfied: $7.80 < f1/CT1 < 256.47$.

8. The optical lens assembly as claimed in claim 1, wherein a focal length of the first lens is f1, a focal length of the second lens is f2, a thickness of the first lens along the optical axis is CT1, a thickness of the second lens along the optical axis is CT2, and the following condition is satisfied: $-7.72 < (f2/CT1) + (f1/CT2) < 100.65$.

9. The optical lens assembly as claimed in claim 1, wherein a focal length of the first lens is f1, a focal length of the second lens is f2, and the following condition is satisfied: $-1.28 < f1/f2 < 7.37$.

10. The optical lens assembly as claimed in claim 1, wherein a radius of curvature of a visual-side surface of the third lens is R5, a radius of curvature of the image source-side surface of the third lens is R6, a focal length of the second lens is f2, a thickness of the second lens along the optical axis is CT2, and the following condition is satisfied: $4.88 < R5*R6/(f2*CT2) < 40.13$.

11. The optical lens assembly as claimed in claim 1, wherein a radius of curvature of a visual-side surface of the fourth lens is R7, a thickness of the fourth lens along the optical axis is CT4, and the following condition is satisfied:

$$5.29 < R7/CT4 < 78.07.$$

12. The optical lens assembly as claimed in claim 1, wherein a maximum effective radius of an image source-side surface of the second lens is CA4, an absolute value of a displacement in parallel to the optical axis from an intersection between a visual-side surface of the second lens and the optical axis to a maximum effective radius position on the visual-side surface of the second lens is TDP3 and the following condition is satisfied: $2.58<CA4/(TDP3+TDP6)<10.54$.

13. The optical lens assembly as claimed in claim 1, wherein a radius of curvature of a visual-side surface of the first lens is R1, a thickness of the first lens along the optical axis is CT1, and the following condition is satisfied:

$$5.27<R1/CT1<139.95.$$

14. The optical lens assembly as claimed in claim 1, wherein a focal length of the first lens is f1, a thickness of the second lens along the optical axis is CT2, a thickness of the fourth lens along the optical axis is CT4, and the following condition is satisfied: $10.14 \text{ mm}<(CT4*f1)/(CT2+CT3)<278.32 \text{ mm}$.

15. An electronic device, comprising:
a housing;
an optical lens assembly disposed in the housing;
an image source disposed on an image source plane of the optical lens assembly in the housing; and
a controller disposed in the housing and electrically connected to the image source;
wherein the optical lens assembly comprises:
a reflective polarizer;
a phase retarder; and
in order from a visual side to an image source side, a first lens with positive refractive power; a second lens with refractive power; a third lens with refractive power, including a visual-side surface and an image source-side surface; a partial-reflective-partial-transmissive element; and a fourth lens with refractive power;
wherein the optical lens assembly has a total of four lenses with refractive power, the image source-side surface of the third lens is convex in a paraxial region thereof, the reflective polarizer is disposed between the first lens and the second lens, the phase retarder is disposed between the reflective polarizer and the partial-reflective-partial-transmissive element, a thickness of the third lens along an optical axis is CT3, an absolute value of a displacement in parallel to the optical axis from an intersection between the image source-side surface of the third lens and the optical axis to a maximum effective radius position on the image source-side surface of the third lens is TDP6, and the following condition is satisfied: $0.37<CT3/TDP6<5.39$.

16. The electronic device as claimed in claim 15, wherein a maximum effective radius of a visual-side surface of the first lens is CA1, an absolute value of a displacement in parallel to the optical axis from an intersection between the visual-side surface of the first lens and the optical axis to a maximum effective radius position on the visual-side surface of the first lens is TDP1, and the following condition is satisfied:

$$4.42<CA1/TDP1<41.58.$$

17. The electronic device as claimed in claim 15, wherein a focal length of the third lens is f3, a focal length of the fourth lens is f4, a thickness of the fourth lens along the optical axis is CT4, and the following condition is satisfied:

$$-120.81<(f3/CT3)+(f4/CT4)<158.75.$$

18. The electronic device as claimed in claim 15, wherein a focal length of the first lens is f1, a focal length of the second lens is f2, a thickness of the first lens along the optical axis is CT1, a thickness of the second lens along the optical axis is CT2, and the following condition is satisfied: $-7.72<(f2/CT1)+(f1/CT2)<100.65$.

19. The electronic device as claimed in claim 15, wherein a radius of curvature of a visual-side surface of the fourth lens is R7, a thickness of the fourth lens along the optical axis is CT4, and the following condition is satisfied: $5.29<R7/CT4<78.07$.

20. The electronic device as claimed in claim 15, wherein a focal length of the first lens is f1, a thickness of the second lens along the optical axis is CT2, a thickness of the fourth lens along the optical axis is CT4, and the following condition is satisfied:

$$10.14 \text{ mm}<(CT4*f1)/(CT2+CT3)<278.32 \text{ mm}.$$

* * * * *